(12) United States Patent
Shiroyama et al.

(10) Patent No.: US 6,912,445 B2
(45) Date of Patent: Jun. 28, 2005

(54) CAD CONSULTING METHOD, METHOD FOR DETECTING INAPPROPRIATE SHAPE CHANGE, DATA STORAGE MEDIUM, AND A COMPUTER PROGRAM PRODUCT

(75) Inventors: Koji Shiroyama, Hitachinaka (JP); Shunsuke Minami, Mito (JP); Yasumasa Kawashima, Hitachi (JP); Kyu Kabata, Naka (JP); Nobuhisa Seya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 825 days.

(21) Appl. No.: 09/793,887

(22) Filed: Feb. 28, 2001

(65) Prior Publication Data

US 2002/0015036 A1 Feb. 7, 2002

(30) Foreign Application Priority Data

Aug. 7, 2000 (JP) ........................ 2000-244001

(51) Int. Cl.[7] .................. G06F 15/60; G06F 19/00
(52) U.S. Cl. .................. 700/182; 700/97; 700/159; 345/441; 318/568.11
(58) Field of Search .................. 700/90, 95, 97.1, 700/17, 159, 180, 182; 345/418–420, 441; 318/568.11; 706/919

(56) References Cited

U.S. PATENT DOCUMENTS

| | | | | |
|---|---|---|---|---|
| 4,901,253 A | * | 2/1990 | Iwano et al. | 345/419 |
| 5,249,135 A | * | 9/1993 | Fujita | 700/179 |
| 5,311,784 A | * | 5/1994 | Girard et al. | 73/865.8 |
| 5,412,300 A | * | 5/1995 | Meyer et al. | 318/568.11 |
| 5,717,905 A | * | 2/1998 | Iwamoto et al. | 703/1 |
| 5,923,573 A | * | 7/1999 | Hatanaka | 703/2 |
| 6,303,251 B1 | * | 10/2001 | Mukai et al. | 430/5 |

FOREIGN PATENT DOCUMENTS

JP 7-260464 * 10/1995

* cited by examiner

Primary Examiner—Jayprakash N. Gandhi
(74) Attorney, Agent, or Firm—Antonelli, Terry, Stout & Kraus, LLP

(57) ABSTRACT

A method for detecting shapes that are undesirable for efficient processing and which occur from tolerance conversion by comparing a geometric relationship of shape elements obtained from shape data before tolerance conversion with a geometric relationship of the shape elements obtained from shape data after tolerance conversion. An inappropriate shape is identified when the compared geometric relationships are not the same.

20 Claims, 30 Drawing Sheets

FIG.17
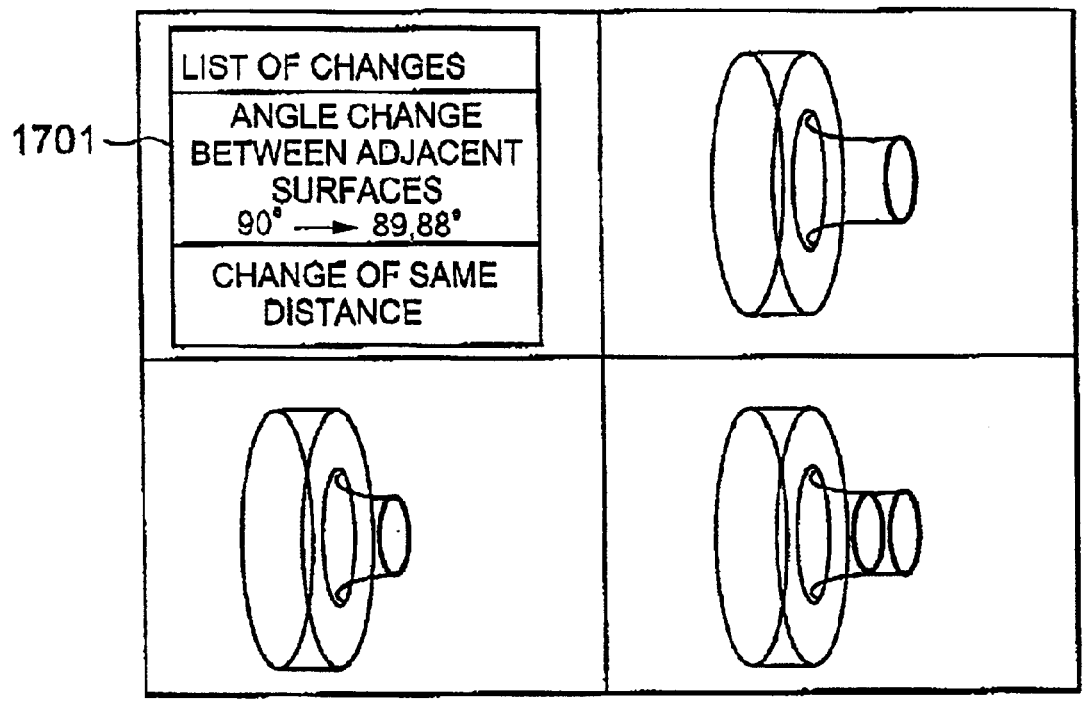
FIG.18A  FIG.18B
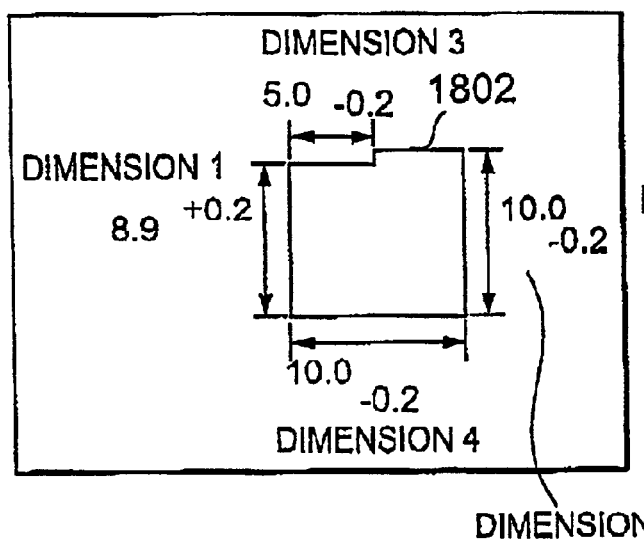
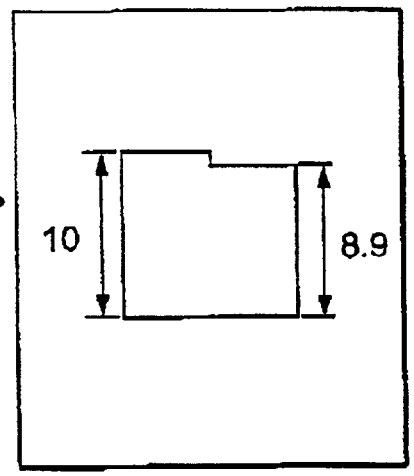

FIG.20

ANGLE
    BETWEEN SURFACE 1 AND SURFACE 2: 90 DEGREES
    BETWEEN SURFACE 2 AND SURFACE 3: 90 DEGREES
    BETWEEN SURFACE 3 AND SURFACE 4: 0 DEGREES
    BETWEEN SURFACE 4 AND SURFACE 5: 89.88 DEGREES
PARALLEL SURFACES
    SURFACE 1, SURFACE 3, SURFACE 5
PARALLEL AXES
    SURFACE 2, SURFACE 4
SAME AXIS
    SURFACE 2, SURFACE 4

FIG.21

2101 — ANGLE CHANGE
    BETWEEN SURFACE 4 AND SURFACE 5
    90 -> 89.88 — 2103
2102 — CHANGE OF THE SAME DISTANCE
    BETWEEN SURFACE 1 AND SURFACE 3,
    BETWEEN SURFACE 3 AND SURFACE 5

CAD CONSULTING METHOD, METHOD FOR DETECTING INAPPROPRIATE SHAPE CHANGE, DATA STORAGE MEDIUM, AND A COMPUTER PROGRAM PRODUCT

This application is based on Japanese Patent Application No. 2000-244001 filed on Aug. 8, 2000, the contents of which are incorporated hereinto by reference.

BACKGROUND OF THE INVENTION

The present invention relates to a tolerance conversion technology using computer-aided design (CAD) data.

Japanese Patent Laid-open Publication (kokai) 5-225290 teaches a common tolerance conversion technology for converting shapes using a parametric function.

Achieving an integrated CAD/CAM (computer-aided manufacturing) system capable of generating numeric control (NC) data for machine tool control based on CAD data generated from the design requires a tolerance conversion step for converting shapes by converting the nominal dimensions specified by the design to process dimensions determined in consideration of a defined tolerance. However, if there is a problem in a manner that the process dimensions are determined in the process dimensions, the tolerance conversion step can create a shape which is contrary to the user's intention and requires one or more extra processing steps, thus increasing the production cost. Such shapes are referred to herein as "inappropriate shapes".

This is further described below with reference to FIG. 2 and FIG. 3, which show examples of such inappropriate shapes.

In the example shown in FIG. 2 the design angle between surfaces 201 and 202 is perpendicular, but is changed to an acute angle as a result of tolerance conversion. In addition to the increased production cost of parts in which the angle between two such surfaces changes from perpendicular to acute, the finished shape can also be dangerous, thus requiring an additional process.

In the example shown in FIG. 3 surfaces 301 and 302 should be on the same plane but are offset at different heights. The part before shape conversion enables surfaces 301 and 302 to be processed in a single operation using a single large tool. Channel 303 can then be formed using a smaller tool. The part before shape conversion thus provides greater freedom in tool selection, making It possible to suppress the production cost. However, production cost is increased by the part resulting from shape conversion, however, because the change in surface positions reduces the degree of freedom in both tool selection and processing methods.

Changes such as these to an inappropriate process shape resulting from tolerance conversion as described above are difficult to find by visual inspection because the changes are so small.

Furthermore, if detection precision is defined as (number of changes between shape elements inappropriate to processing)/(number of changes between all detected shape elements), changes in shape elements inappropriate to processing will also be detected if shape elements are simply compared, and the number of detections will increase. This is because the changes in inappropriate shape elements produced by tolerance conversion are numerous between particular shape elements, and this is not considered.

SUMMARY OF THE INVENTION

An object of the present invention is therefore to detect change between shape elements inappropriate to processing with high precision, said change resulting from tolerance conversion.

A further object of the present invention is to improve the degree of freedom in processing, and to lower production cost.

A further object of the present invention is to provide an integrated CAD/CAM system for integrating parts modelling by the CAD section with NC programming by the CAM section.

To achieve the above objects, the present invention provide with a method comprising steps of: obtaining shape data for a design object and process dimensions data for the design object from a customer system by way of a communication line; a obtaining geometric relationship for shape elements before tolerance conversion based on the shape data and process dimensions data received from the customer system; carrying out tolerance conversion using the shape data and process dimensions data; obtaining a geometric relationship for the shape elements after tolerance conversion based on shape data after tolerance conversion; determining whether the geometric relationship of the shape elements after tolerance conversion and the geometric relationship of the shape elements before tolerance conversion are the same or not based on the geometric relationship of the shape elements before tolerance conversion and the geometric relationship of the shape elements after tolerance conversion; and notifying the customer system by way of the communication line that an inappropriate shape occurred as a result of tolerance conversion when the geometric relationships are determined to be not the same.

Further, according to the present invention, there are provided a computer program product comprising program code means for implementing the CAD consulting method or the method for detecting inappropriate shape change according to the present inventions and a data storage medium holding a program for implementing one of these methods according to the present invention.

The customer can thus easily know whether shapes inappropriate for production are produced when tolerance conversion is applied to the prepared CAD data according to the invention. Reduced production costs, reduced production time, and a greater degree of freedom in processing can therefore be provided to the customer.

It is also possible by means of the present invention to detect with high precision shapes that are undesirable for production as a result of tolerance conversion.

BRIEF DESCRIPTION OF THE DRAWINGS

These and other features, objects and advantages of the present invention will become more apparent from the following description when taken in conjunction with the accompanying drawings wherein:

FIG. 17 is a screen showing the changes resulting from an angle causing the change in the geometric relationship between the shape elements;

FIG. 18 describes a method for identifying a causative dimension;

FIG. 20 is a table of data describing the geometric relationship between the shape elements after tolerance conversion;

FIG. 21 shows data for a detected change;

Shown in the figures and referenced herein are: data recorder 101; tolerance conversion means (processor) 102; detection means (processor) 103 for detecting change in the geometric relationship between elements; display 104: step 2301 for recording the tolerance and shape before tolerance conversion; tolerance conversion step 2302; step 2303 for detecting change in the geometric relationship between elements; display step 2304; before and after shape recording step 2401 for recording shapes before and after tolerance conversion; data generation step 2801, tolerance setting step 2802; tolerance conversion step 2803; shape inspection step 2804; NC programming step 2805; detection step 2901 for detecting change in the geometric relationship between elements; and inappropriate process shape evaluation step 2902.

THE PREFERRED EMBODIMENT

While we have shown and described an embodiment in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

Figure 37:
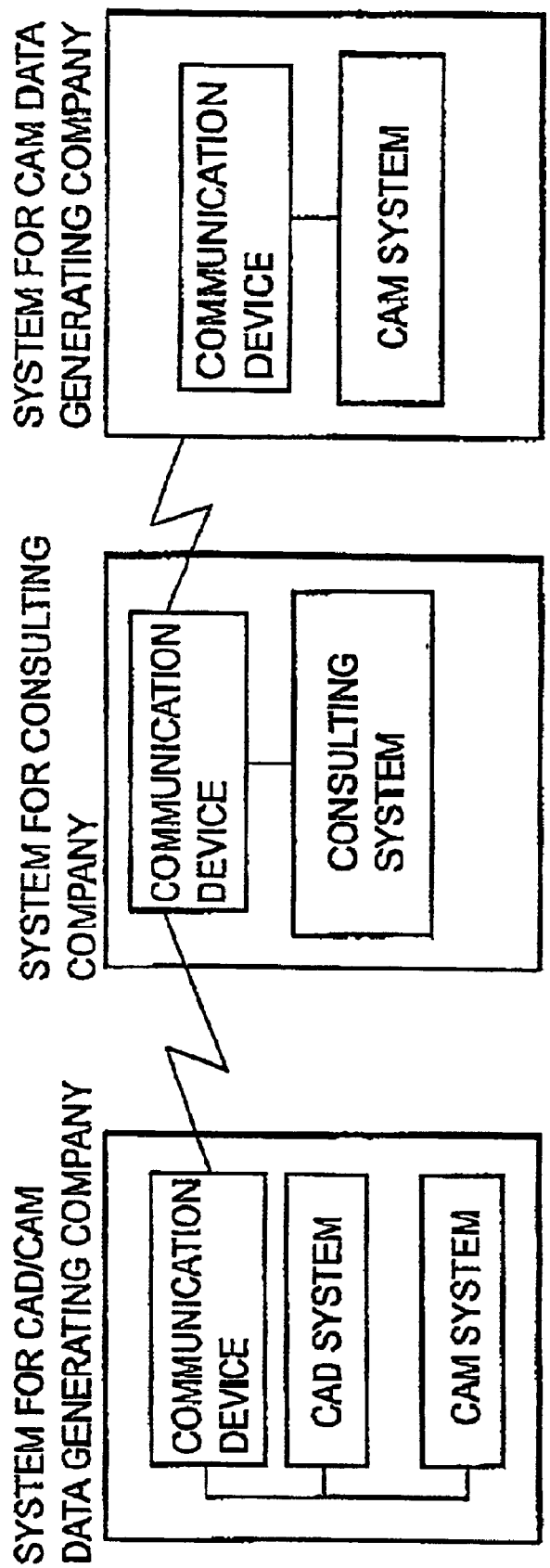
FIG. 37 is a conceptual illustration of a consulting system.
Figure 38:
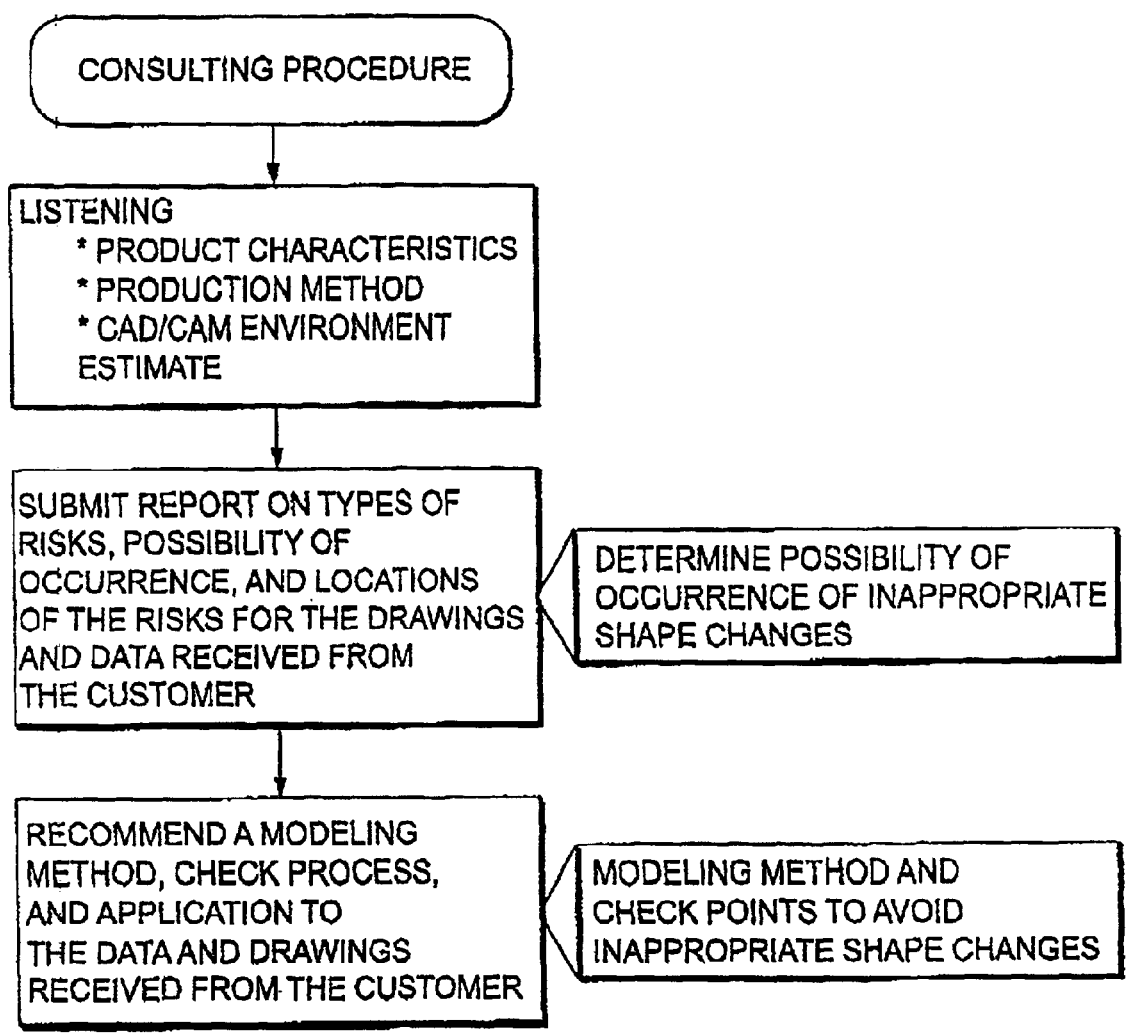
FIG. 38 is a conceptual illustration of a consulting service.

FIG. 37 is a conceptual illustration of a consulting system used to provide a CAD data consulting service according to a preferred embodiment of the present invention.

This consulting system consists of a system for a consulting company, a system for a CAD/CAM data generating company, and a system for a CAM data generating company.

The system for the consulting company comprises a consulting system and communications device enabling communication with the CAM data generating company and the CAD/CAM data generating company, that is, the customer.

The system for the CAD/CAM data generating company comprises communications device for communicating with the consulting company, and a CAD system and CAM system for generating CAD data and CAM data via the communications means.

The CAM data generating company is a company that entered into a contract with the CAD data generating company. The consulting company is informed of the contractual relationship between the CAM data generating company and the CAD data generating company, and the system for the CAM data generating company and the system for the consulting company are connected via a communications path so that the consulting results can also be provided to the CAM data generating company. It should be noted that the invention is described below using by way of example a service between a CAD/CAM data generating company and a consulting company, more specifically a service for returning consulting results to the CAD/CAM data generating company, and it will be obvious that the basic process remains the same even if the destination changes. Further, the CAD/CAM data generating company and CAM data generating company refer not only to the concerns that generate the CAD or CAM data, but also to manufacturers that also use the data to manufacture goods.

A consulting system according to the present invention first receives particular information from the CAD/CAM data generating company, typically a customer of the consulting company, through the communication device. This received information includes CAD data, the CAD and CAM system environment, production methods, and other relevant information. The CAD data includes the drawings, shape data, and production dimensions data. The CAD/

CAM system environment includes the types of systems and the specific formats of the CAD data and the CAM data. It should be noted that the system environment must be specified because data formats and parametric conversion methods differ In different systems, and the tolerance conversion method must therefore be adjusted accordingly. In some situations the CAD/CAM data generating company is responsible only for CAD data generation while CAM data generation is sent to a separate CAM data generating company. In such situations the CAD data is received from the CAD data generating company or CAD/CAM data generating company, and the CAM data format and CAM system environment are received from the CAM data generating company.

Based on the received CAD data, the types of risks and the locations where such risks are likely to occur during tolerance conversion are added to the drawings and reported. This report also contains detection results indicative of whether inappropriate shape conversion will occur during tolerance conversion.

Furthermore, when an inappropriate shape conversion is detected in this consulting system, a modelling method for avoiding such inappropriate shape conversion (a method for determining dimensions between shape elements so that inappropriate shape conversion may not occur) and CAD data that will not produce such an inappropriate shape conversion, are generated and sent via the communication path to the CAD/CAM data generating company or CAM data generating company. If the CAD/CAM data generating company or CAM data generating company can obtain such consulting service, they can generate CAD data or CAM data that will not produce such inappropriate shape conversion. Furthermore, a reduction in the degree of freedom in processing can be prevented, and an increase in production cost resulting from process failure can be prevented. It is also possible to convert all CAD data to CAM data.

A consulting system used in the above consulting service for detecting the inappropriate shape conversions is described next below with reference to FIG. 25.

Figure 25:
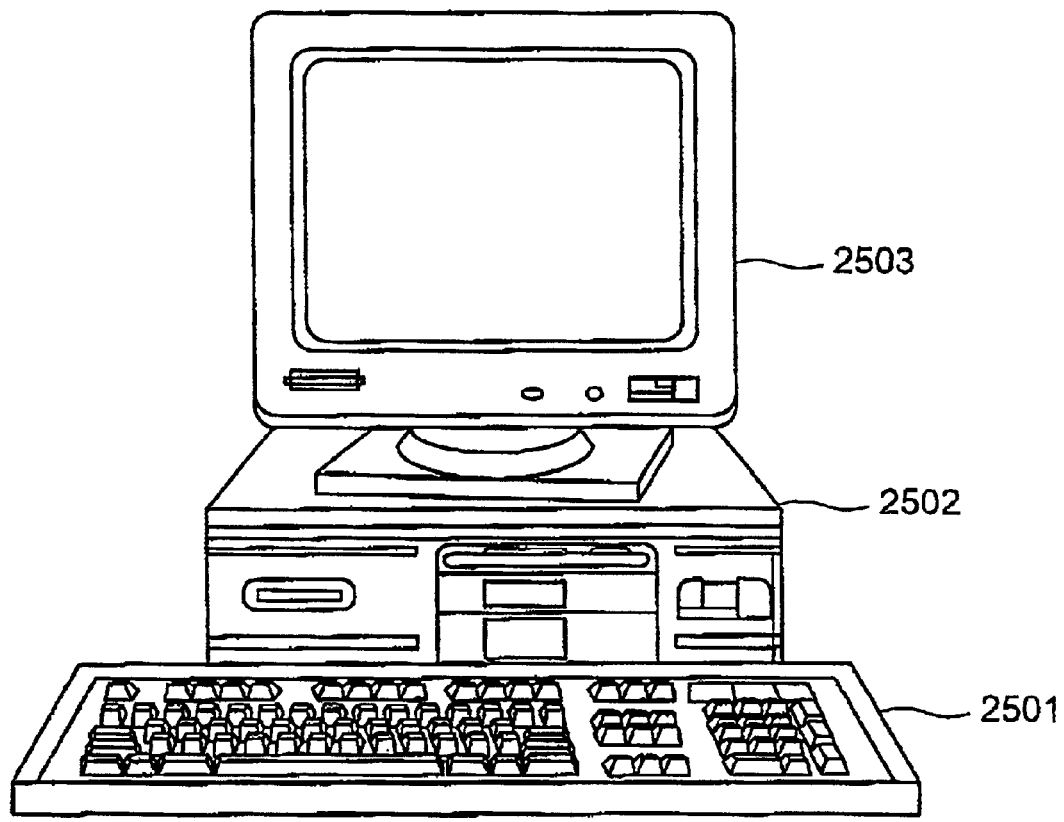
FIG. 25 describes a consulting system according to the present invention.
Figure 26:
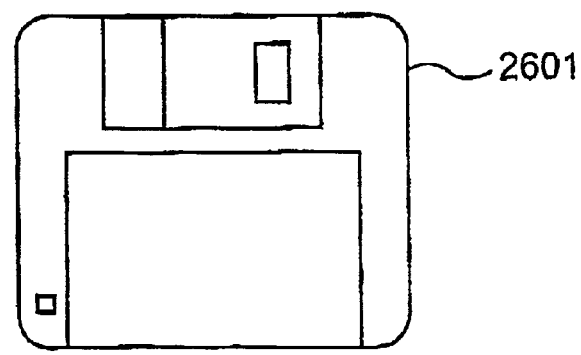
FIG. 26 shows a magnetic disk.
Figure 27:
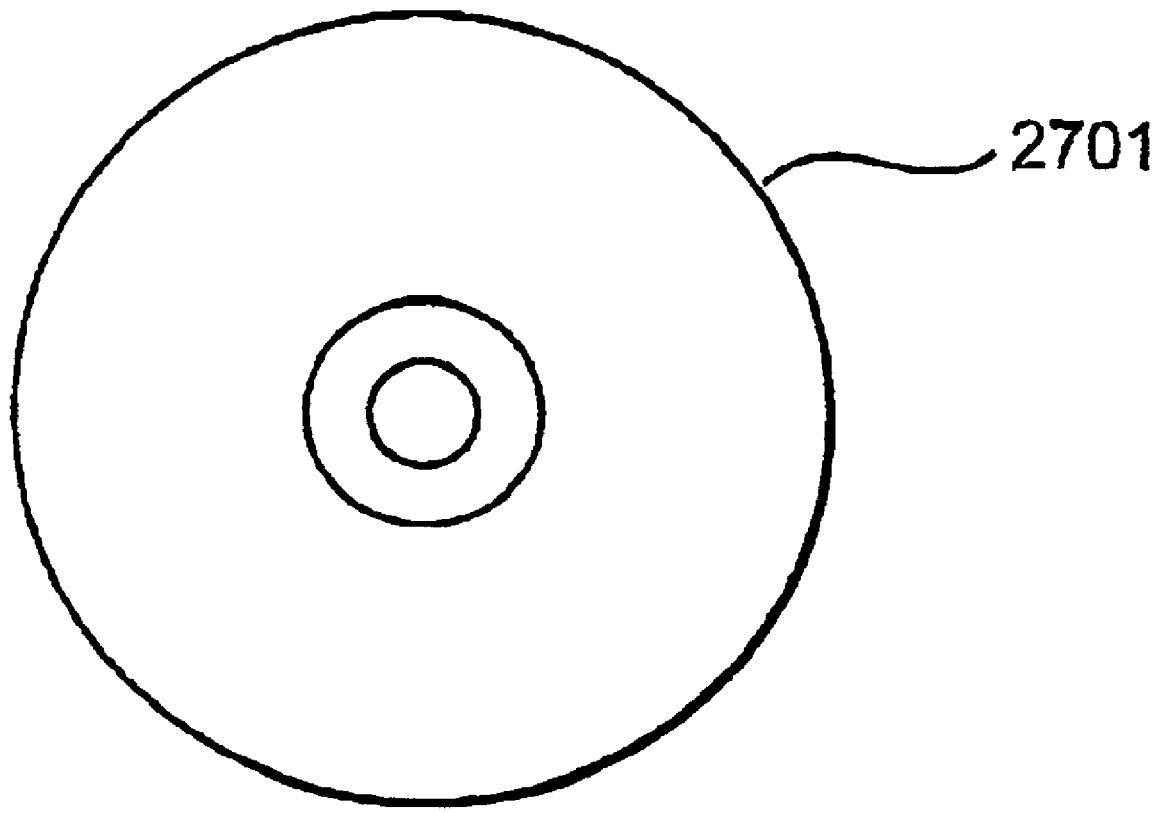
FIG. 27 shows a CD-ROM.

As shown in FIG. 25, the consulting system according to this preferred embodiment comprises a server 2502 (data processing device) with data storage device, display 2503, and input device 2501. A program with a function for detecting inappropriate shape conversion (referred to below as a "shape change detection program") is installed to the data storage device of the server 2502 from a data storage medium such as a floppy disk shown in FIG. 26 or a CD-ROM shown in FIG. 27. A processing unit of the server then runs this program installed to the data storage device in the main memory of the server to achieve the functions of this consulting system.

Figure 1:
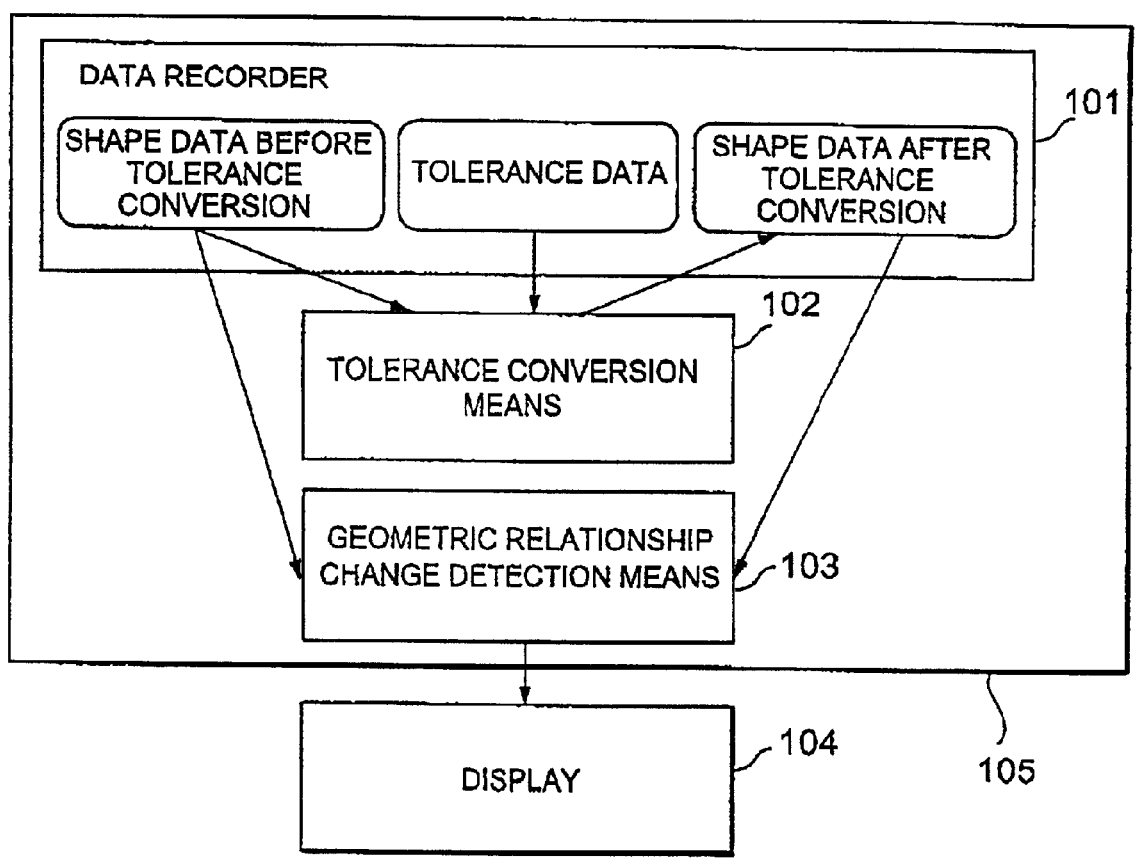
FIG. 1 is a block diagram of a consulting system.

FIG. 1 is a block diagram showing the functions achieved by providing this shape change detection program to the processing unit.

The data recorder 101 records CAD data, which includes process dimensions data, including tolerance data, and shape data. The CAD data is received from the CAD/CAM data generating company.

The tolerance conversion means (processor) 102 generates shape data after tolerance conversion from the process dimensions data and the shape data recorded in the data recorder 101 before tolerance conversion. It also records the shape data resulting from tolerance conversion to the data recorder 101.

The detection means (processor) 103 for detecting a change in the geometric relationship between elements obtains the geometric relationship between the shape elements before tolerance conversion from the process dimensions data (design dimension+tolerance) and the shape data recorded in data recorder 101 before tolerance conversion. This is accomplished by storing the below-defined criteria of the geometric relationship into the data recorder 101, and detecting whether there are any geometric relationships between shape elements that meet these criteria. The geometric relationship between shape elements is also obtained from the shape data after tolerance conversion. These geometric relationships are then compared, and if there is a match, or if within a particular tolerance range of the process dimensions, the detection means (processor) 103 judges there was a change in the geometric relationship between elements before and after tolerance conversion, and the element and place where the change occurred are detected.

Detection results are then presented on the display and transmitted to a communication device of the CAD/CAM data generating company, that is, the customer.

Next, certain terms that is used herein are defined.

"Process dimension" is a range of values obtained by adding the tolerance to the nominal design dimension, or a value obtained by adding the median, maximum, and minimum tolerance values or a specific value set by the user between maximum and minimum tolerance values to the nominal design dimension.

"Shape element" or "element" indicates any element used to define the shape of the design object, including a plane, line, point, axis of rotation, or center of an arc.

"Geometric relationship between shape elements" refers to any parameter defining the relative positions between elements, including the angle between elements, whether elements are parallel, whether elements occupy the same position, whether the distance between elements is the same, and whether the parameters of a specific element are the same before and after tolerance conversion Note that "same" as used herein includes values that are within the numeric range defined as the nominal dimension plus/minus the tolerance.

Figure 2:
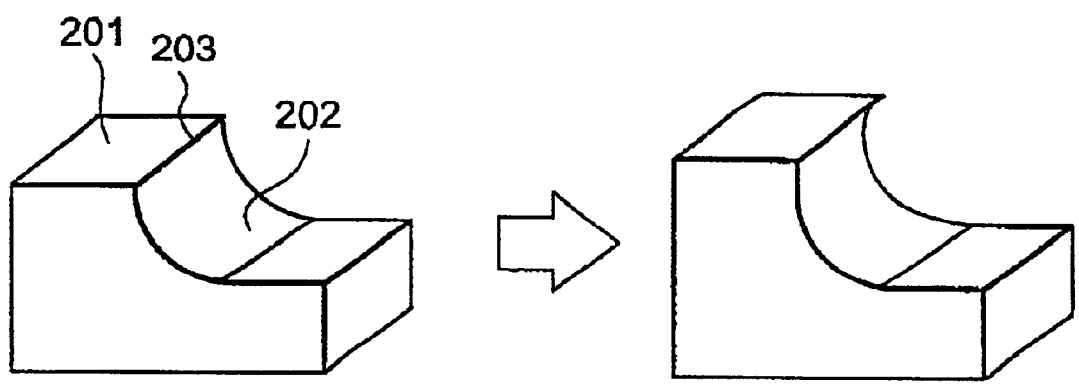
FIG. 2 shows an example of an inappropriate shape resulting from a change in angle.
Figure 4:
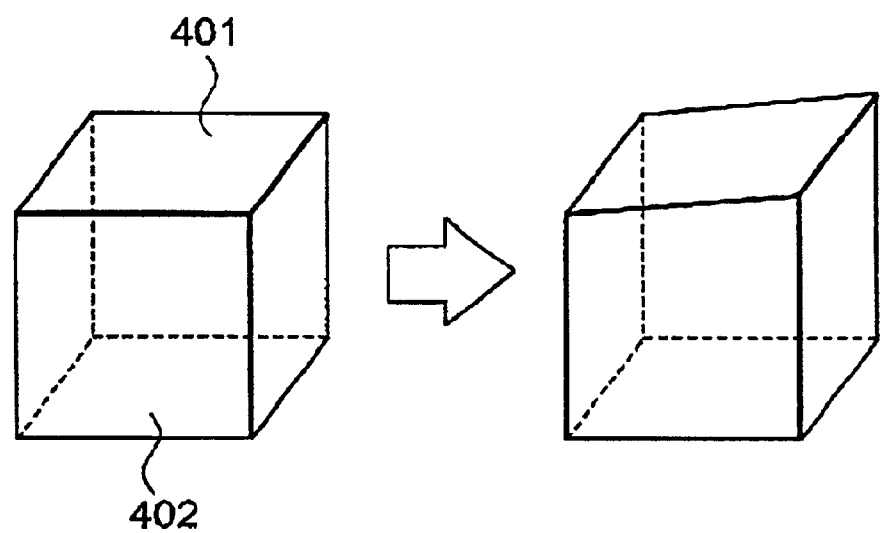
FIG. 4 shows a change in parallel surfaces.
Figure 5:
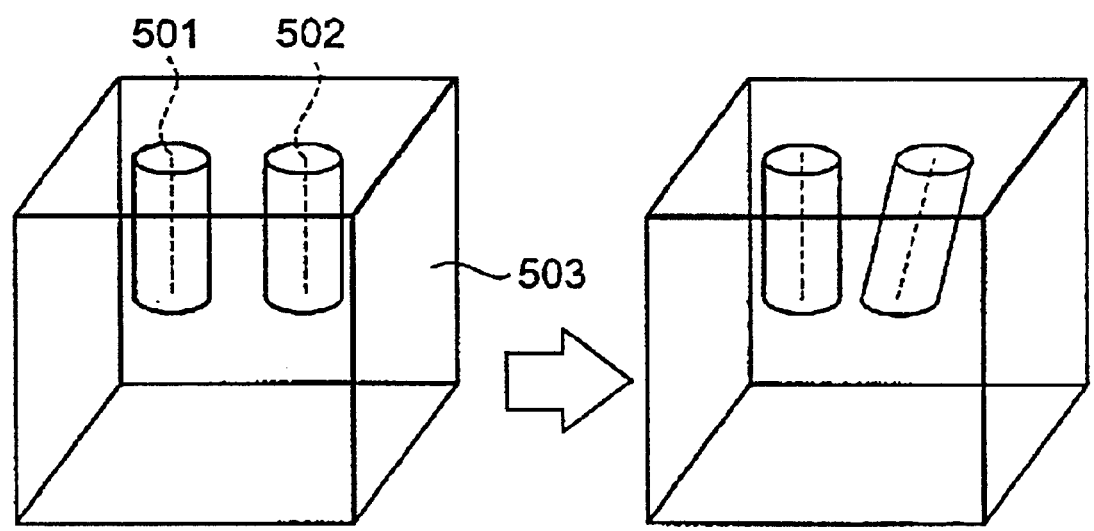
FIG. 5 shows a change in the axes of parallel rotating surfaces and change between a flat surface and the axes of parallel rotating surfaces.

Note further that a change in angle between elements includes, for example, a change in the angle between two adjacent surfaces such as shown in FIG. 2. An "angle between surfaces" includes angles formed at the boundary between the surfaces. Furthermore, a change in "elements" includes a change in parallel (deviation from parallel) between a combination of surfaces such as surfaces 401 and 402 in FIG. 4, a change in parallel (deviation from parallel) between a combination of axes of rotating surfaces such as axis 501 of a cylindrical surface and axis 502 of a cylindrical surface as shown in FIG. 5, and a change in parallel between a combination of a rotational axis and plane surface, such as between axis 502 of a cylindrical surface and flat surface 503 in FIG. 5. Note that the dotted lines in FIG. 5 indicate the axis of a rotating surface.

Figure 3:
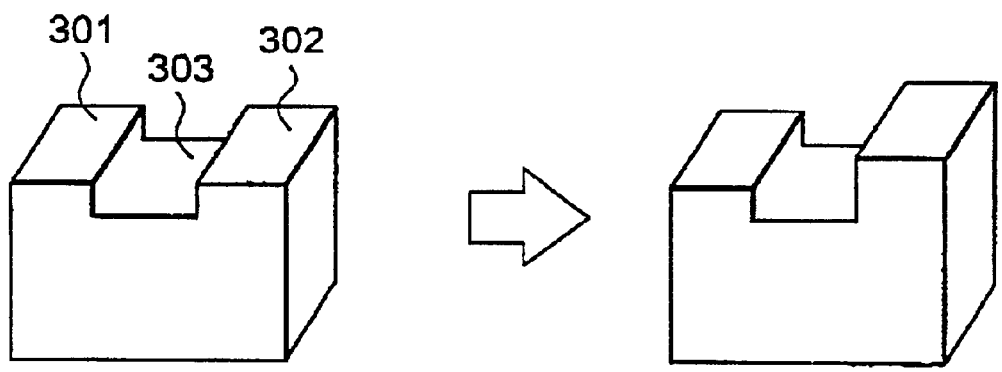
FIG. 3 shows an example of an inappropriate shape resulting from a change in the height of coplanar surfaces.
Figure 6:
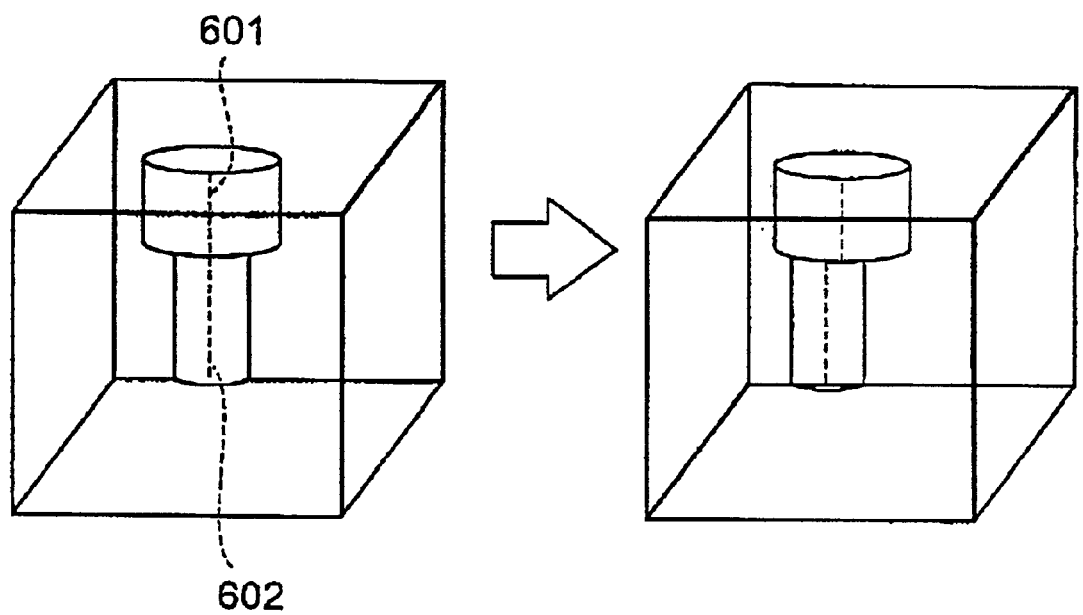
FIG. 6 shows a change in the axis of rotating surfaces on the same line.

Furthermore, a change in the "position of an element is the same" refers, for example, to a change in a combination of surfaces located on the same plane such as shown in FIG. 3, or a change in the alignment of a combination of coaxial rotating surfaces such as shown by axis 601 of a cylindrical surface and axis 602 of a cylindrical surface in FIG. 6.

Figure 7:
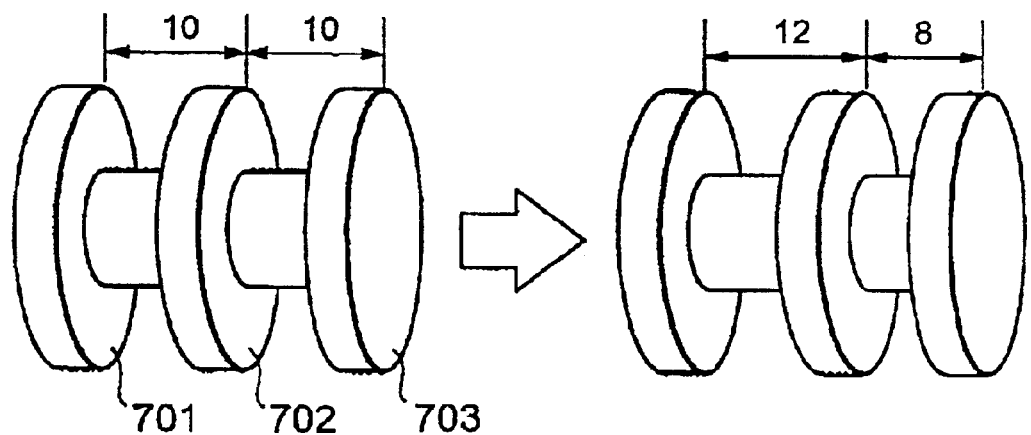
FIG. 7 shows a change in the equal distances.

A change in the "distance between elements is the same" applies, for example, to a combination of equidistantly spaced parallel planes as shown in FIG. 7. In other words, the distance between surfaces 701 and 702 and between surfaces 702 and 703 is the same, 10 units in this example, before conversion in FIG. 7. After conversion, however, the distance between surfaces 701 and 702 is 12 units, and the distance between surfaces 702 and 703 is 8 units. The distances are thus not the same after conversion, and there has been a change in distance.

Figure 8:
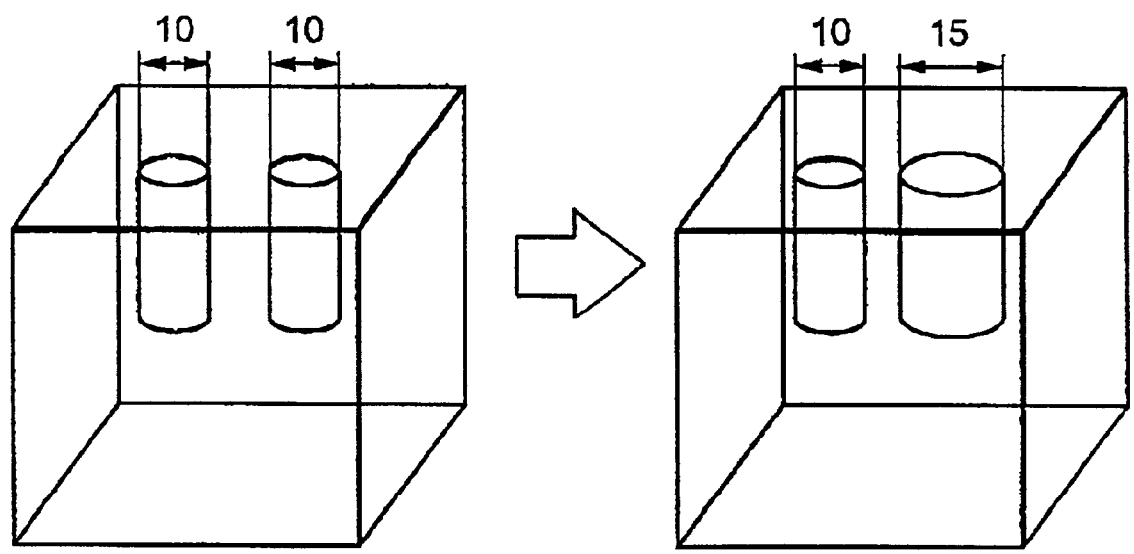
FIG. 8 shows a change in the diameter of cylindrical surfaces.

Furthermore, a change in "parameters defining a shape element are the same" includes, for example, change in a combination of elements having the same parameter value for a surface of the same type. For example, the diameters of cylindrical surfaces 801 and 802 in FIG. 8 are the same before conversion, but are not the same after conversion.

Next, operation screens presented on the display when the functions shown in the block diagram of FIG. 1 operate are described with reference to FIG. 9 to FIG. 17.

Figure 9:
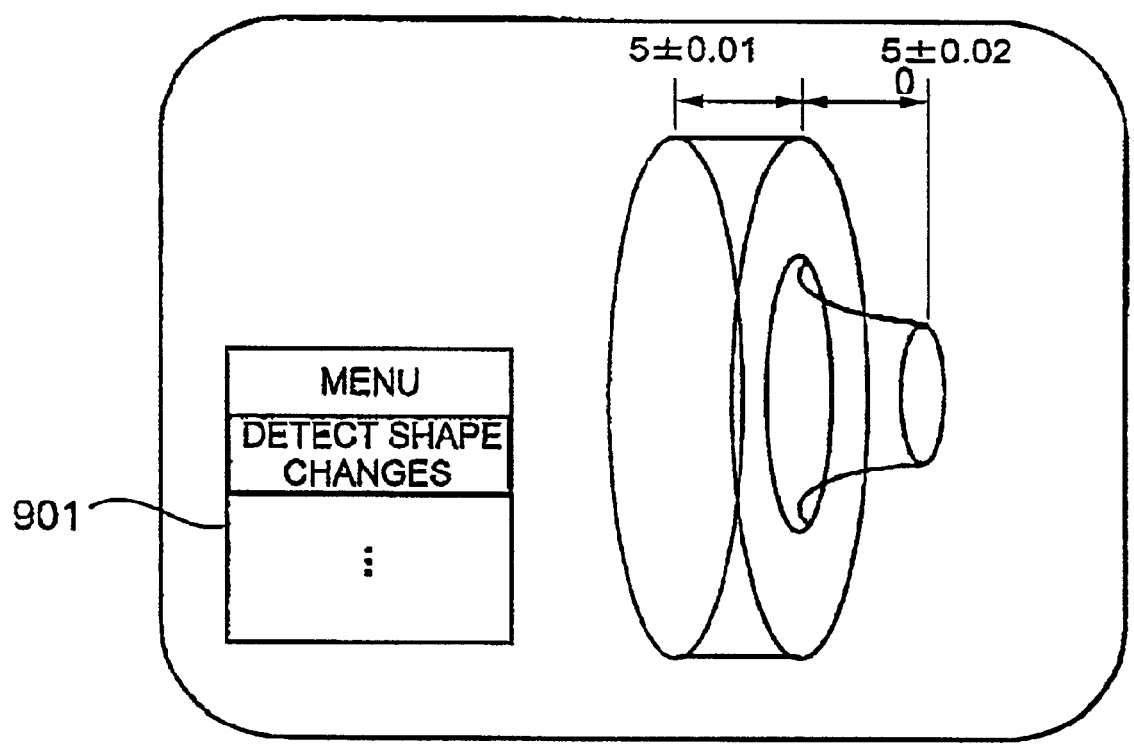
FIG. 9 shows a screen for shape change detection operation.

FIG. 9 shows a display of a part for which a tolerance is specified.

Figure 10:
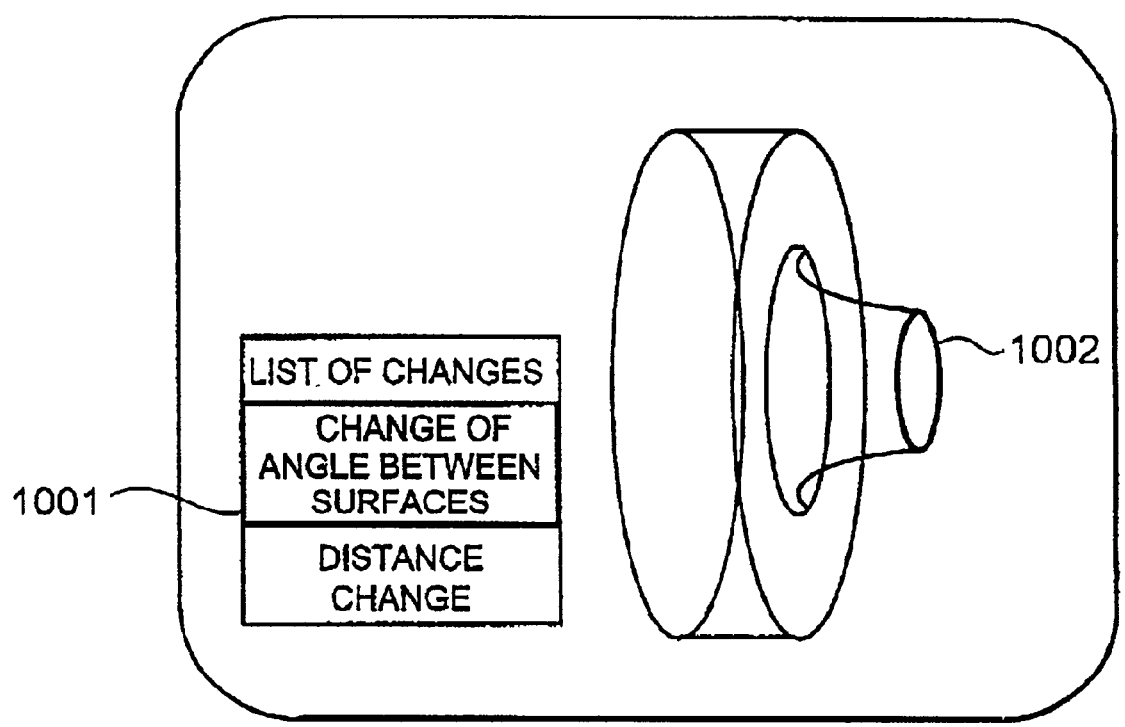
FIG. 10 shows a screen for shape change detection output.

This screen presents a shape, including tolerance and dimension values, and a menu 901. When the "detect shape change" item is selected from the menu 901, inappropriate shape changes are detected by detecting a change In a geometric relationship between shape elements as described above. If such a change is detected, that is, the geometric relationship is not the same before and after tolerance conversion, a screen such as shown in FIG. 10 is presented. If an inappropriate shape change is detected, the detected changes are displayed in type list 1001, which is a list of the types of inappropriate shape changes detected. The changes are also displayed on the image according to detected change 100 corresponding to the type of the change. It should be noted that the type of the change is indicated by the type of geometric relationship between the changed elements, such as a change in angle between faces or a change in a same distance.

Figure 11:
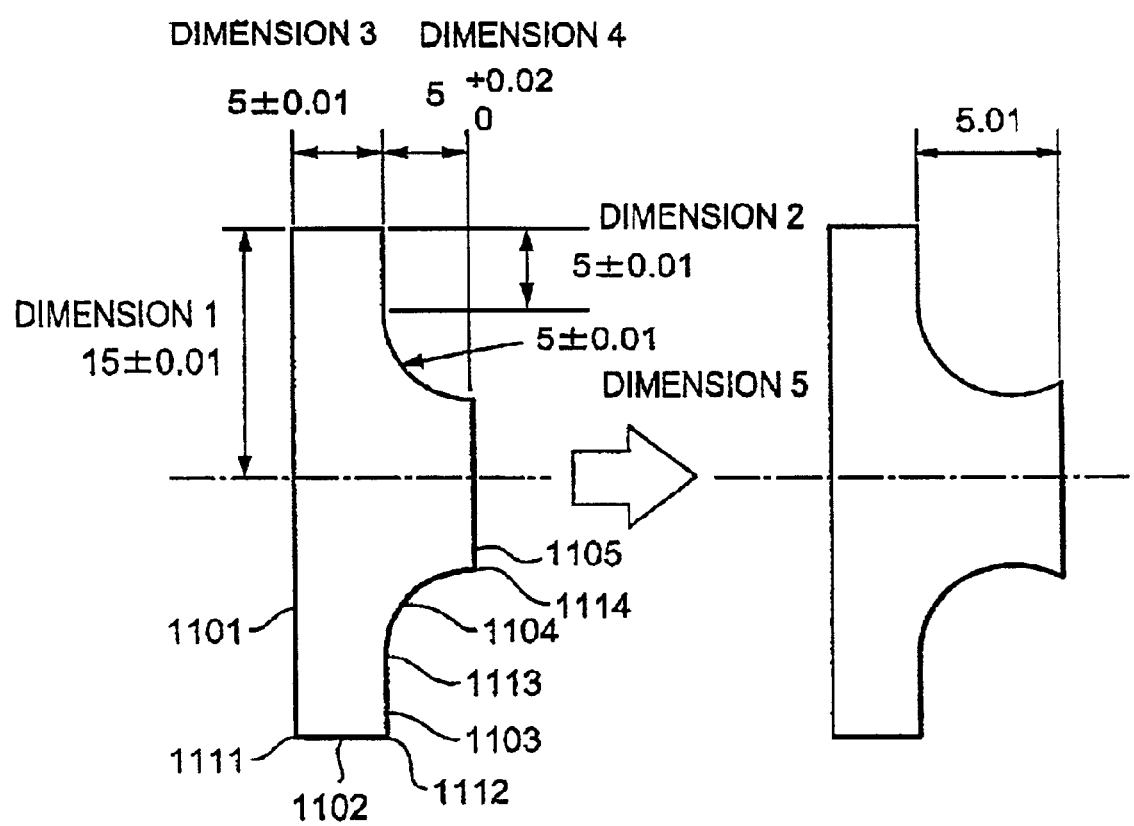
FIG. 11 is a section view of the part shown in FIG. 9 before and after tolerance conversion.

FIG. 11 is a section view of the part shown in FIG. 9 before and after tolerance conversion. The images shown in FIG. 11 are presented by selecting another menu item. It should be noted that lines in these section views correspond to surfaces such that the surface indicated by reference numeral 1101 is referred to below as surface 1, the surface indicated by reference numeral 1102 is referred to below as surface 2, the surface indicated by reference numeral 1103 is referred to below as surface 3, the surface Indicated by reference numeral 1104 is referred to below as surface 4, and the surface indicated by reference numeral 1105 is referred to below as surface 5. Points in these section views correspond to lines such that the line indicated by reference numeral 1111 is referred to below as line 1, the line indicated by reference numeral 1112 is referred to below as line 2, the line indicated by reference numeral 1113 is referred to below as line 3, and the line indicated by reference numeral 1114 is referred to below as line 4. As will be known from FIG. 11, inappropriate shape change detection detects that the dimension between surface 3 and surface 5 has changed from 5 to 5.01. It is also shown that the angle between surfaces 4 and 5, and that the distances between surfaces 1 and 3 and between surfaces 3 and 5, which should be the same, have changed.

When a change is selected from in the type list 1001 for display, the shape elements associated with the selected change are highlighted. Highlighting can be variously achieved by, for example, changing the display color or using bold lines. Surfaces can be highlighted with shading. In FIG. 10 the change is displayed by bold line 1002.

Figure 12:
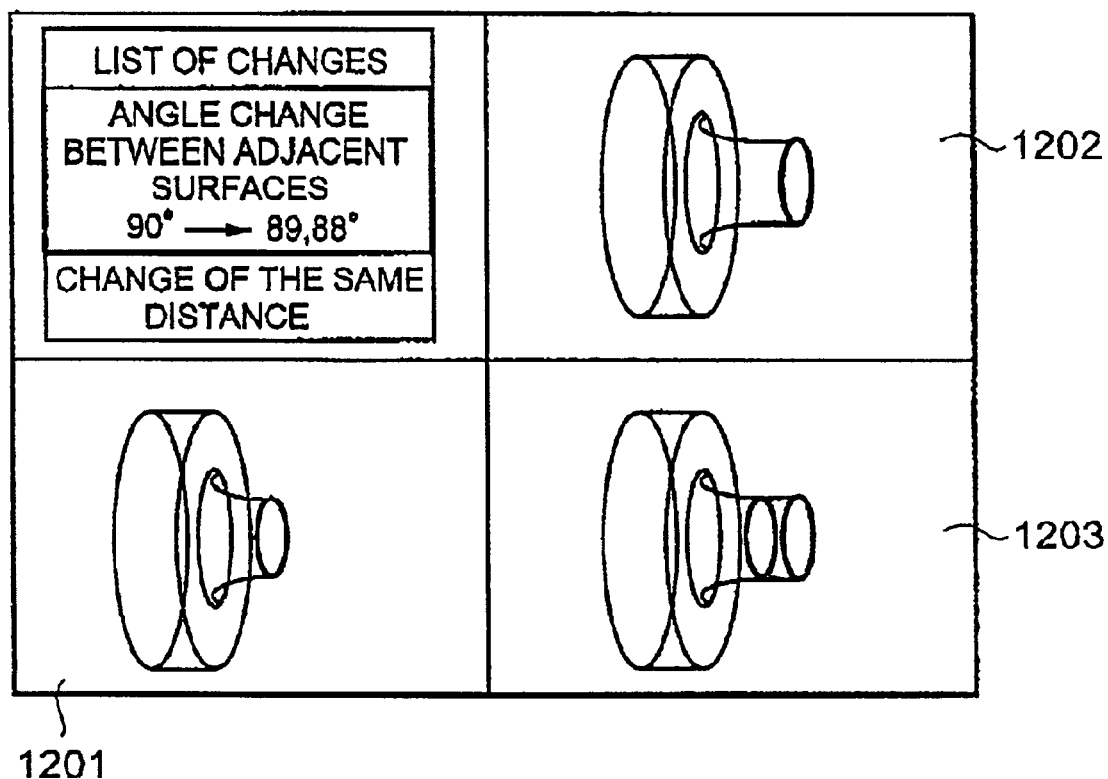
FIG. 12 is an exemplary screen combining a screen showing the shape before tolerance conversion, a screen showing the shape after tolerance conversion, and a screen showing the superimposed shapes before and after tolerance conversion.

The display shown in FIG. 12 can be presented by selecting yet another menu item, for example.

To make it easier to see what changes have occurred, the display shown in FIG. 12 simultaneously shows pane 1201 containing only the shape before tolerance conversion, pane 1202 containing only the shape after tolerance conversion, and pane 1203 containing the shape after tolerance conversion superimposed on the shape before tolerance conversion.

Other display methods can also be used. For example, changes can be grouped for display so that the detected changes can be more easily identified by the user. Exemplary grouped display methods are shown in FIG. 13 to FIG. 17. These displays can also be selected from a menu. Various grouping methods can also be used, including grouping by the type of change, and grouping by the dimensions that caused a change.

FIG. 13 to FIG. 17 show some grouped display methods.

Figure 13:
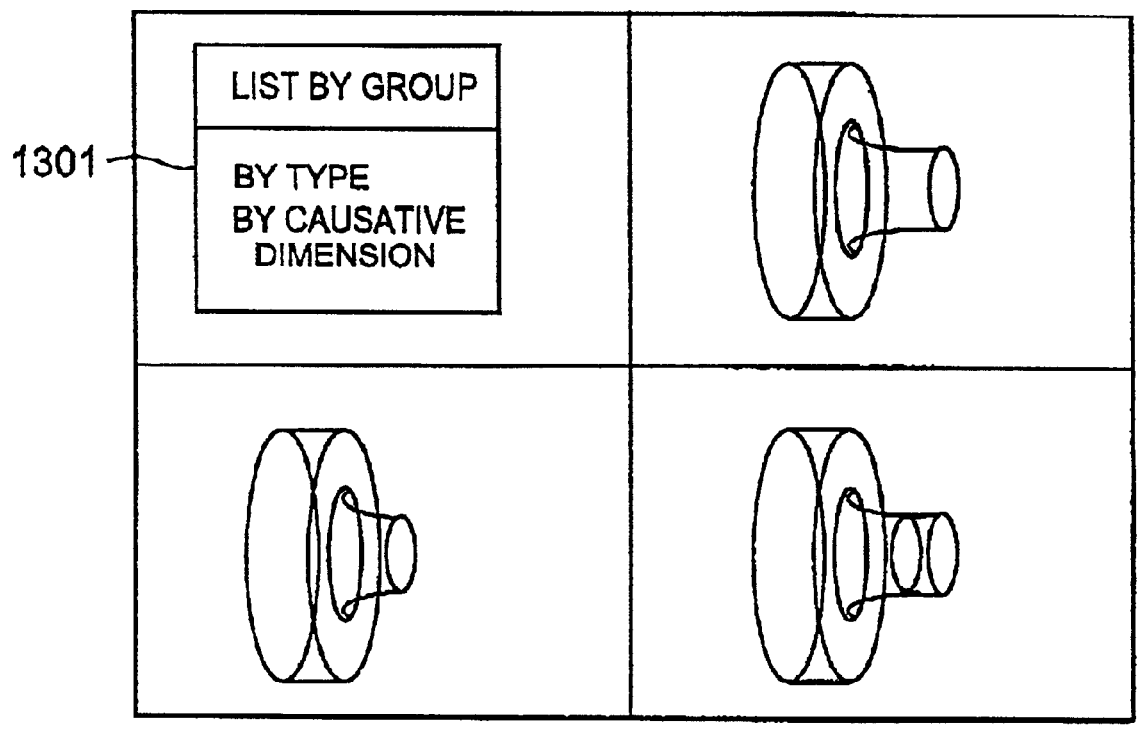
FIG. 13 is a screen presenting a list of grouping methods for user selection.

With the method shown in FIG. 13 a list of grouping methods 1301 is presented so that the user can select a desired display method.

Figure 14:
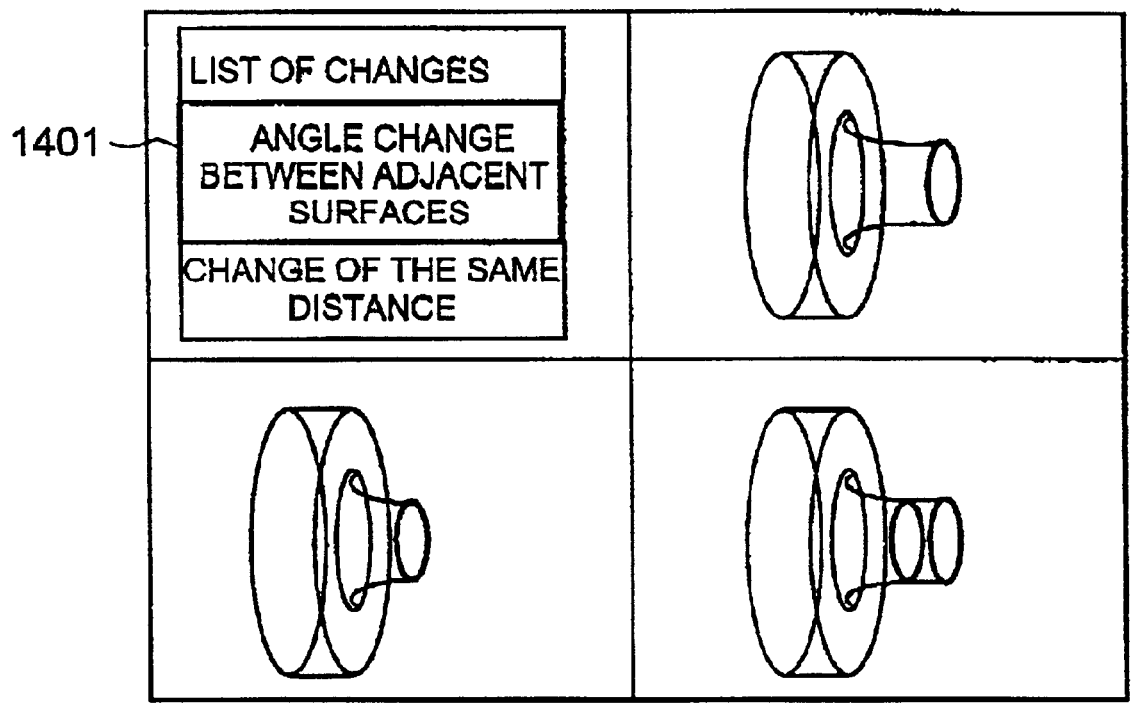
FIG. 14 is a screen presenting a list of conversion types for user selection.

If the user selects "group by type" in FIG. 13, a list of types of changes 1401 is displayed for the user to select the desired type of change as shown in FIG. 14.

Figure 15:
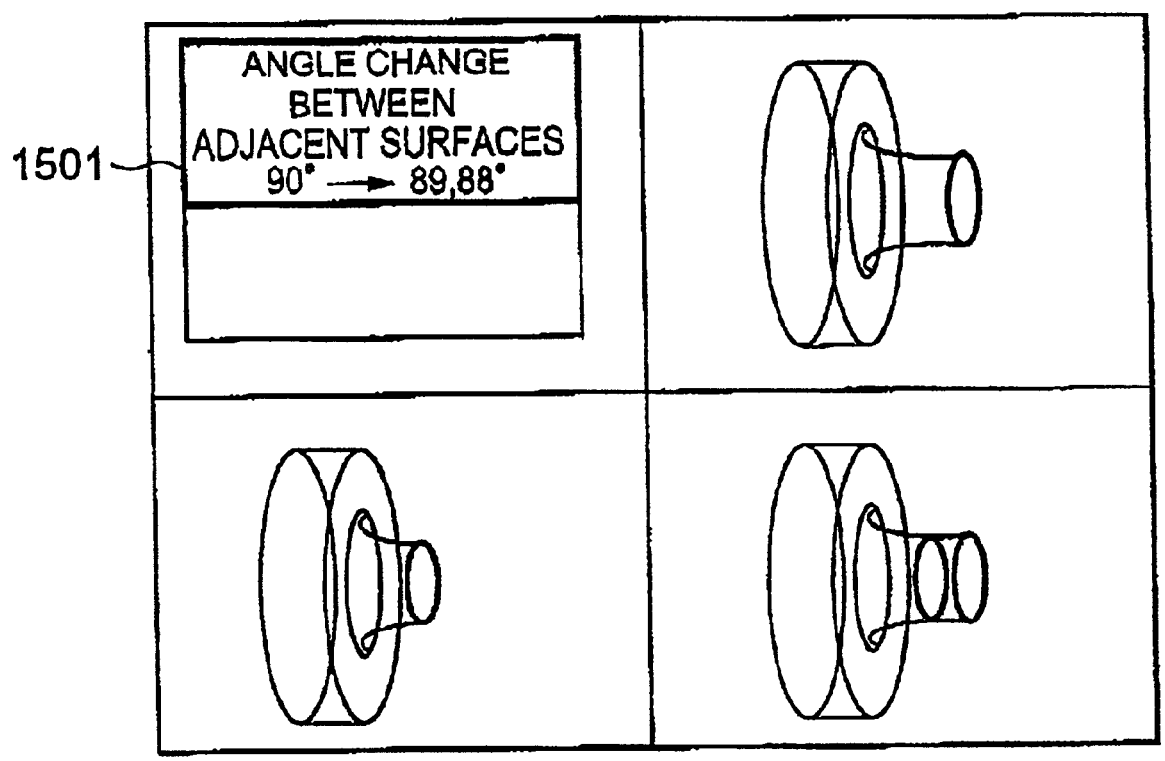
FIG. 15 is a screen presenting a list of angle changes for user selection with the conversion elements selected by the user emphasized.

If the user selects "change in angle" from the choices presented in FIG. 14, a table of angle changes 1501 is presented together with the elements affected by the change selected by the user highlighted in the shape on screen as shown in FIG. 15.

Figure 16:
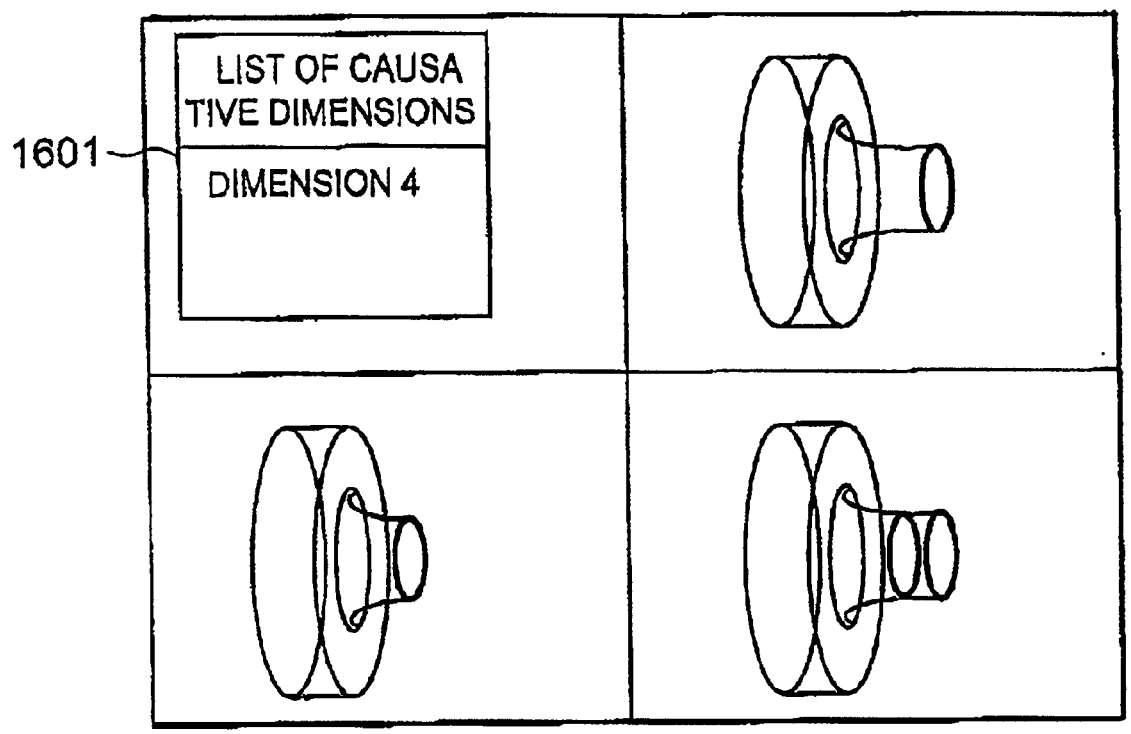
FIG. 16 is a screen showing the changes resulting from a dimension causing change in the geometric relationship between the shape elements.

If the user selects "by causative dimension" from the list of grouping methods 1301 in FIG. 13, a list 1601 of dimensions that caused a change is presented as shown in FIG. 16 for the user to make a selection.

If the user selects "dimension 4" from the list in FIG. 16, a list of changes 1701 that resulted from a change in dimension 4 is displayed, and the changed elements selected by the user are highlighted in the image as shown in FIG. 17.

By thus displaying the detected changes, a system user can view the changes displayed on the screen to more specifically determine if the detected changes are in fact changes to an inappropriate shape.

Identification of causative dimensions is carried out with the following process.

First, shape data for a dimensioned image is tolerance converted, and then it is checked whether changes detected by the detection means (processor) 103 for detecting whether the geometric relationship changes are inappropriate shape changes.

If it is checked that the change is an inappropriate shape change, the dimension that was the cause of the shape change is identified as a "causative dimension" and complete the process.

It should be noted that if a change did not occur, combinations of two dimensions are created and converted as a pair to check whether the combined dimensions produce an inappropriate shape change.

If a change results, the dimensions paired for the combination are identified as causative dimensions and complete the process. If all combinations of two dimensions are checked and shown not to produce a change, this time a combination of three dimensions are checked, and the process repeats. This operation repeats until the combinations of dimensions producing a shape change is found, and the dimensions in the detected combinations are identified as causative dimensions.

Next, a process for identifying the cause of change is described with reference to tolerance conversion of a part having a cross section as shown in FIG. 18.

Tolerance conversion of the part shown in FIG. 18 (a) to the middle of the tolerance range produces a shape as shown in (b). Note that surfaces 1801 and 1802 are reversed.

First, the dimensions are converted individually to check if surfaces 1801 and 1802 are reversed. Conversion of only dimension 1 causes a surface 1803 to disappear with surfaces 1801 and 1802 to become one plane; the surfaces 1801 and 1802 do not reverse the positions. Conversion of only dimension 2 produces the same result. Furthermore, conversion of only dimension 3 or only dimension 4 does not cause the surfaces 1801 and 1802 to reverse.

It is thus found that the surfaces 1801 and 1802 do not reverse the positions as a result of converting only one dimension. The next step is therefore to create combinations of dimensions. There are six possible combinations of two dimensions for the part shown in FIG. 18, that is, dimensions 1 and 2, dimensions 1 and 3, dimensions 1 and 4, dimensions 2 and 3, dimensions 2 and 4, and dimensions 3 and 4. Then it is checked whether surfaces 1801 and 1802 reverse the positions using these six combinations. In this case it is found that converting dimensions 1 and 2 causes the surfaces 1801 and 1802 to reverse. Dimensions 1 and 2 are thus identified as causative dimensions, and complete the process.

An exemplary method for detecting a change in the geometric relationships of a shape element is described next.

The first step is to extract the geometric relationship of each shape element before tolerance conversion from the tolerance data contained in the process dimensions data and shape data before tolerance conversion.

Next, the geometric relationships of the shape elements after tolerance conversion are extracted from the shape data after tolerance conversion.

Figure 19:
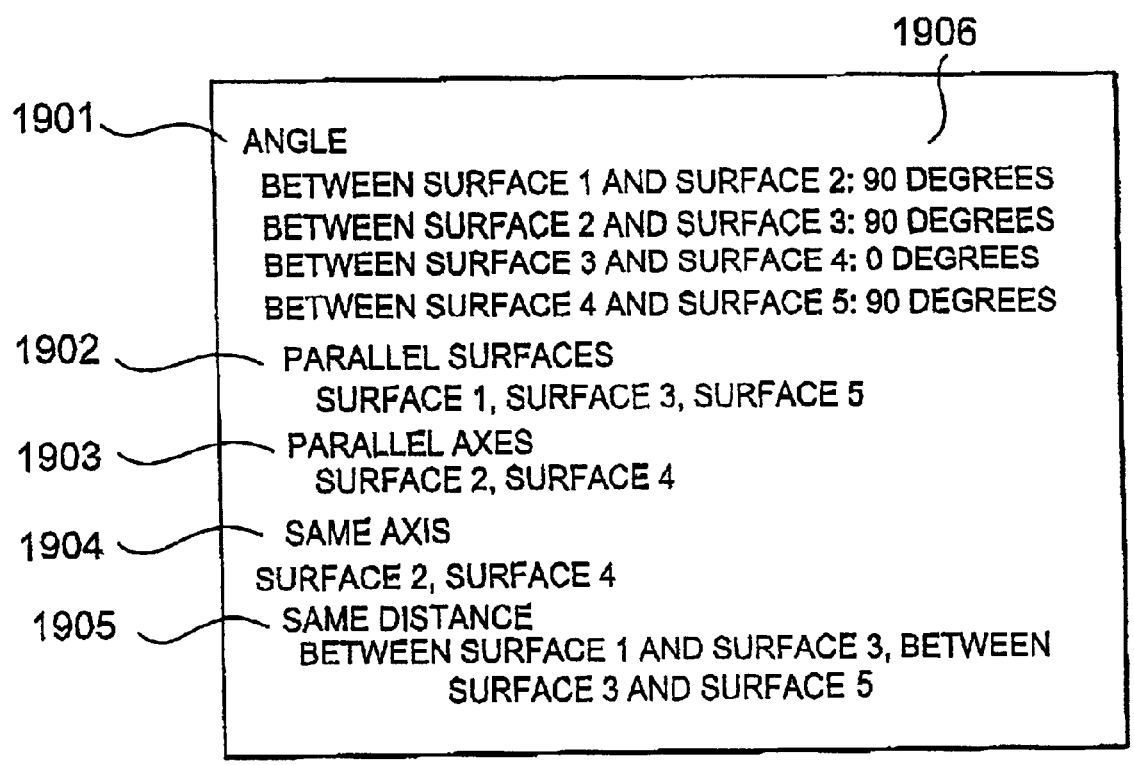
FIG. 19 is a table of data describing the geometric relationship between the shape elements before tolerance conversion.

FIG. 19 shows data indicative of the geometric relationships between the shape elements based on the CAD data before tolerance conversion. Reference numerals 1901, 1902, 1903, 1904, and 1905 indicate the respective type of geometric relationships between the shape elements, and changes are expressed using the corresponding elements and values.

For example, the reference numeral 1906 indicates that the angle between the surface 1 and surface 2 is 90 degrees.

FIG. 20 shows data indicative of the geometric relationships between shape elements after tolerance conversion. The same labels are used for the corresponding shape elements before and after tolerance conversion. Various methods can be used to associate the corresponding shape elements, including comparison by ID, topology, or position.

Change is then detected between geometric relationship data of the shape elements before tolerance conversion and geometric relationship data of the shape element after tolerance conversion.

FIG. 21 shows data for the changes detected. Reference numerals 2101 and 2102 indicate the type of the change. The changes are expressed by shape element and value. For example, reference numeral 2103 indicates a change in the angle between the surfaces 4 and 5 from 90 degrees to 89.88 degrees.

Figure 22:
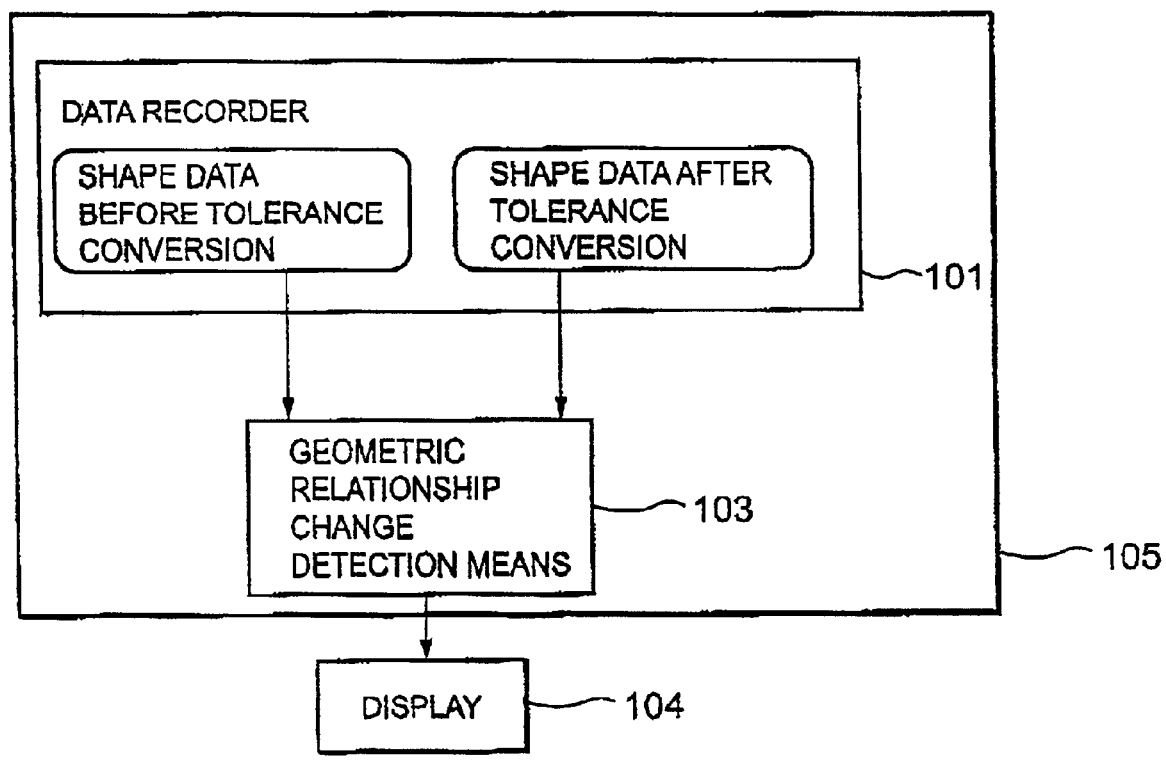
FIG. 22 is a block diagram showing a system configuration according to the present invention.

FIG. 22 is a block diagram of a consulting system configuration according to the present invention.

Data recorder 101 records the shape data both before and after tolerance conversion.

The geometric relationship change detection means (processor) 103 detects a change in the geometric relationships of the shape elements based on the shape data before and after tolerance conversion recorded in the data recorder 101. The changes detected by the detection means (processor) 103 are then shown on the display 104.

Figure 23:
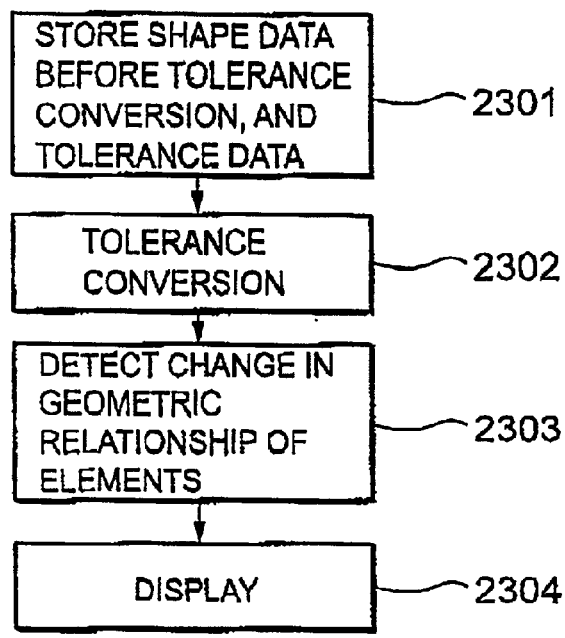
FIG. 23 is a flow chart of a tolerance conversion detection method according to the present invention.

FIG. 23 is a flow chart describing the operation of the geometric relationship change detection means (processor) 103.

The first step is to record the shape data before tolerance conversion and the tolerance data contained in the process dimensions data (step 2301).

Shape data after tolerance conversion is then generated based on the shape data before tolerance conversion and the tolerance data contained in the process dimensions data recorded in step 2301 (step 2302).

Change in the geometric relationships of the shape elements is then detected from the shape data before tolerance conversion recorded in step 2301 and the shape data after tolerance conversion generated in step 2302 (step 2303).

The change in the shape element geometric relationships detected in step 2303 is then presented on the display (step 2304).

Figure 24:
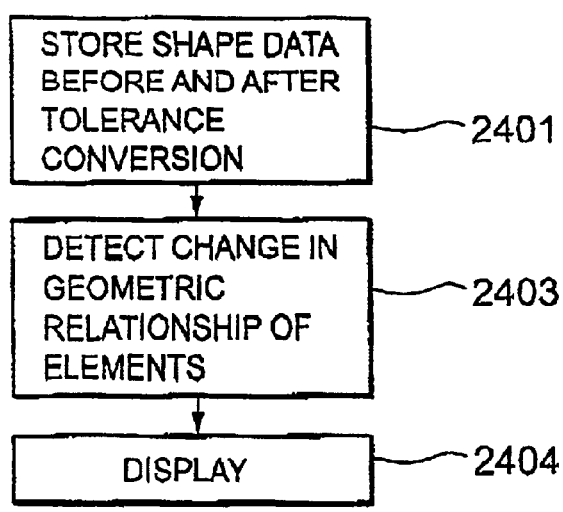
FIG. 24 is a flow chart of a tolerance conversion detection method according to the present invention.

FIG. 24 is a flow chart of an alternative operating method of the geometric relationship change detection means (processor) 103.

The first step in this process is to record the shape data before and after tolerance conversion (step 2401).

Change in the geometric relationships of the shape elements is then detected from the shape data before tolerance conversion and the shape data after tolerance conversion recorded in step 2401 (step 2403).

The change in the shape element geometric relationships detected in step 2403 is then presented on the display (step 2404).

While detecting change before and after tolerance conversion has been described above, the present invention shall not be limited to tolerance conversions and can also be used to detect change resulting from all types of parametric conversions.

In the case of a parametric conversion with the configuration shown in FIG. 1, data indicative of the dimensions after conversion is recorded to the data recorder instead of tolerance data.

While plural functions have been separately described above, the plural functions can be combined in a practical embodiment.

Next, an NC data generating process is described next in FIG. 28.

First, shape data is generated (step 2801).

Tolerances are then defined for each dimension in the shape data generated in the data generation step 2801 (step 2802).

Shape data after tolerance conversion is then generated from the tolerance data generated in step 2801 and the shape data (step 2803).

It is determined if any shapes inappropriate for production are present based on the shape data before tolerance conversion and the shape data after tolerance conversion generated in step 2803. If there are shapes inappropriate for production, the procedure loops back to step 2801 and the shape data is edited (step 2804).

Steps 2801 to 2804 are repeated until there are no inappropriate shapes, When there is no inappropriate shape, NC data is generated (step 2805).

Figure 29:
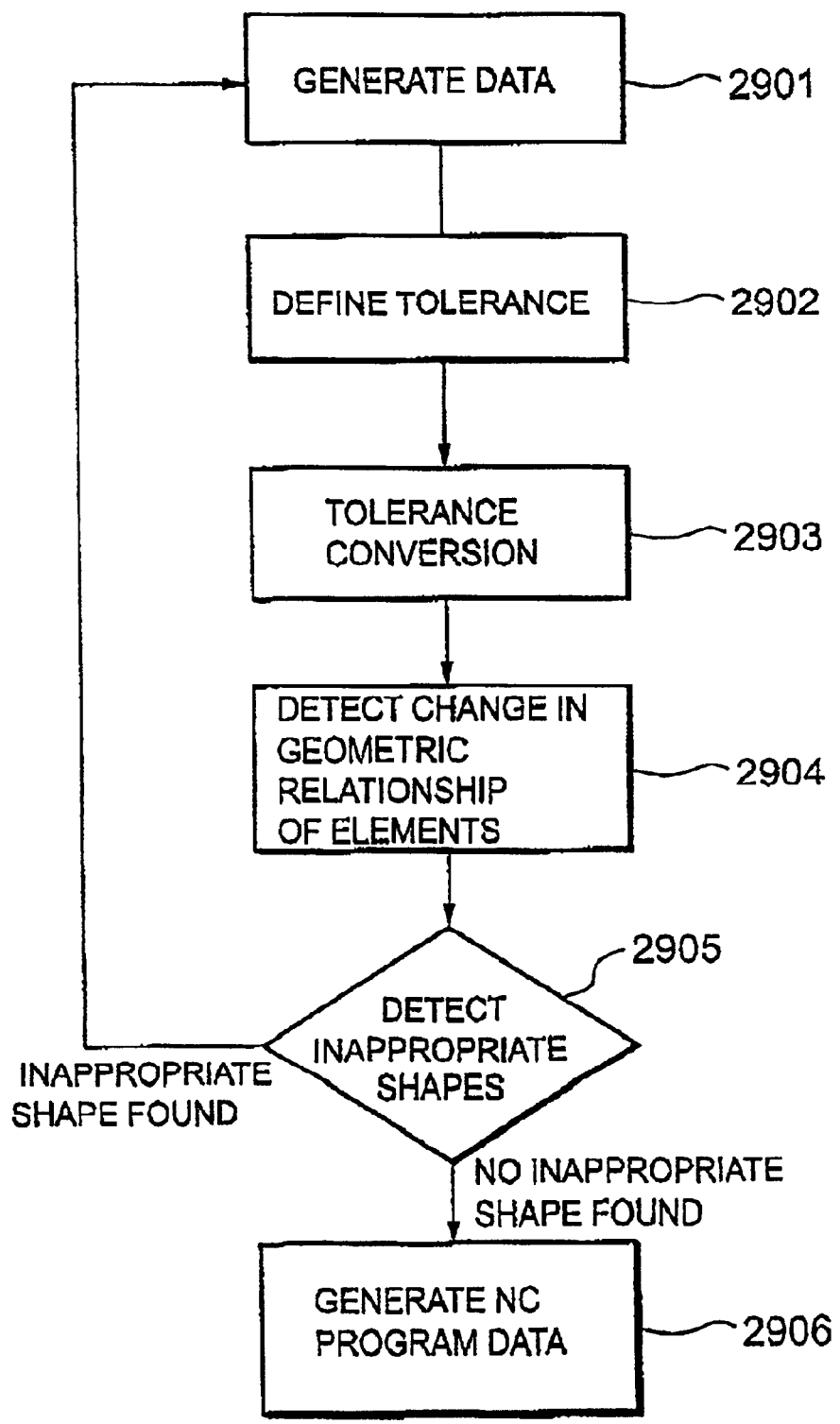
FIG. 29 is a flow chart of an NC data generating process.

Another method for generating NC data according to the present invention is shown in FIG. 29.

Figure 28:
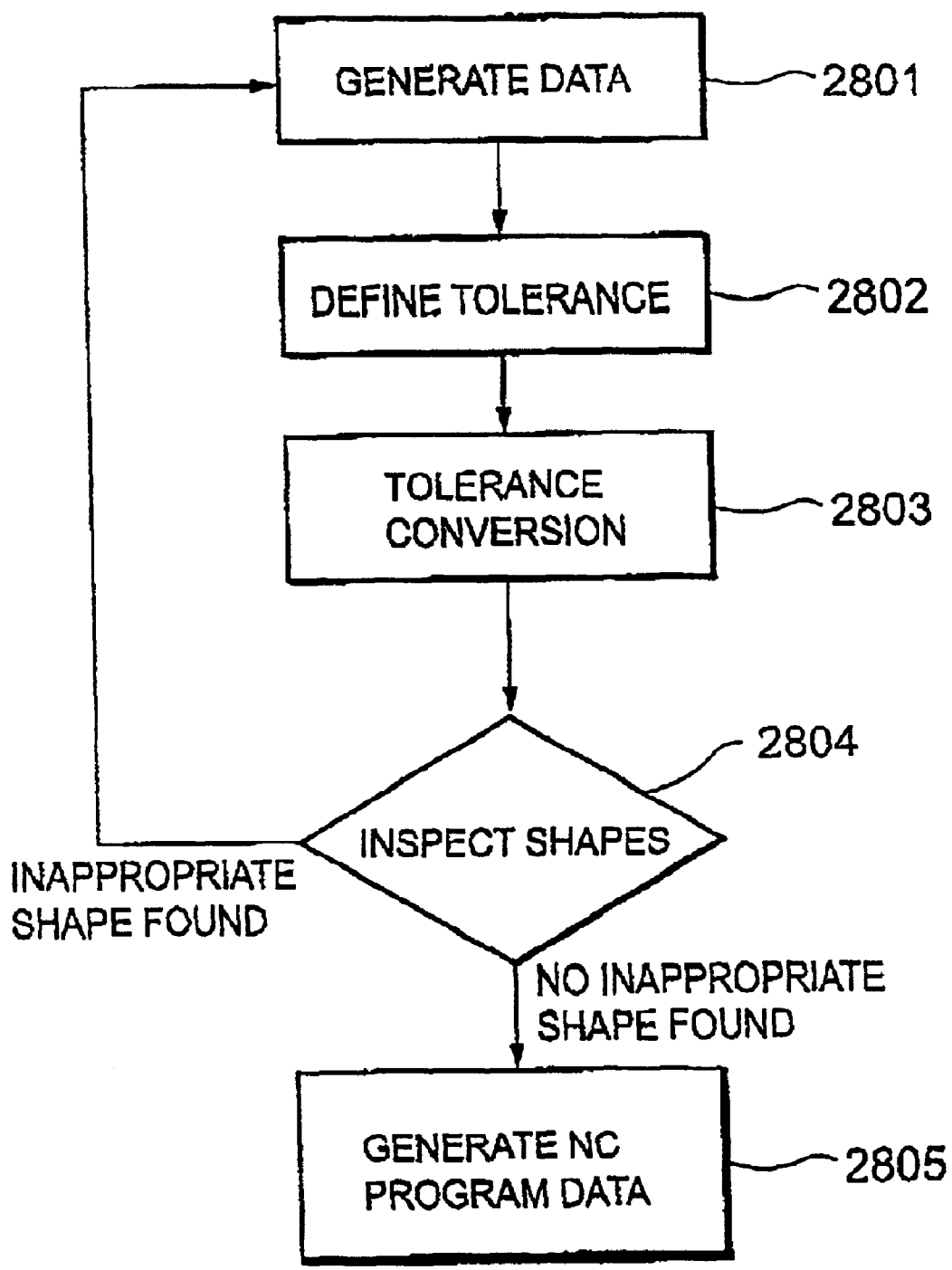
FIG. 28 is a flow chart of an NC data generating process.

Steps 2901 to 2903 are the same as steps 2801 to 2803 in FIG. 28 except that the tolerance conversion step 2903 converts the dimensions of the shape data generated in the data generation step 2801 into process dimensions, and then creates the shape data after tolerance conversion.

Next, change in the geometric relationship of the shape elements is detected from the shape data before tolerance conversion generated in the data generation step 2901 and the shape data after tolerance conversion generated by the tolerance conversion step 2903 (step 2904).

It is determined if any shapes inappropriate for production are present based on the changes detected in step 2904. If there are shapes inappropriate for production, the procedure loops back to step 2901 and the shape data is edited (step 2905). Steps 2901 to 2905 are repeated until there are no inappropriate shapes.

When there is no inappropriate shape, NC data is generated (step 2906).

Figure 30:
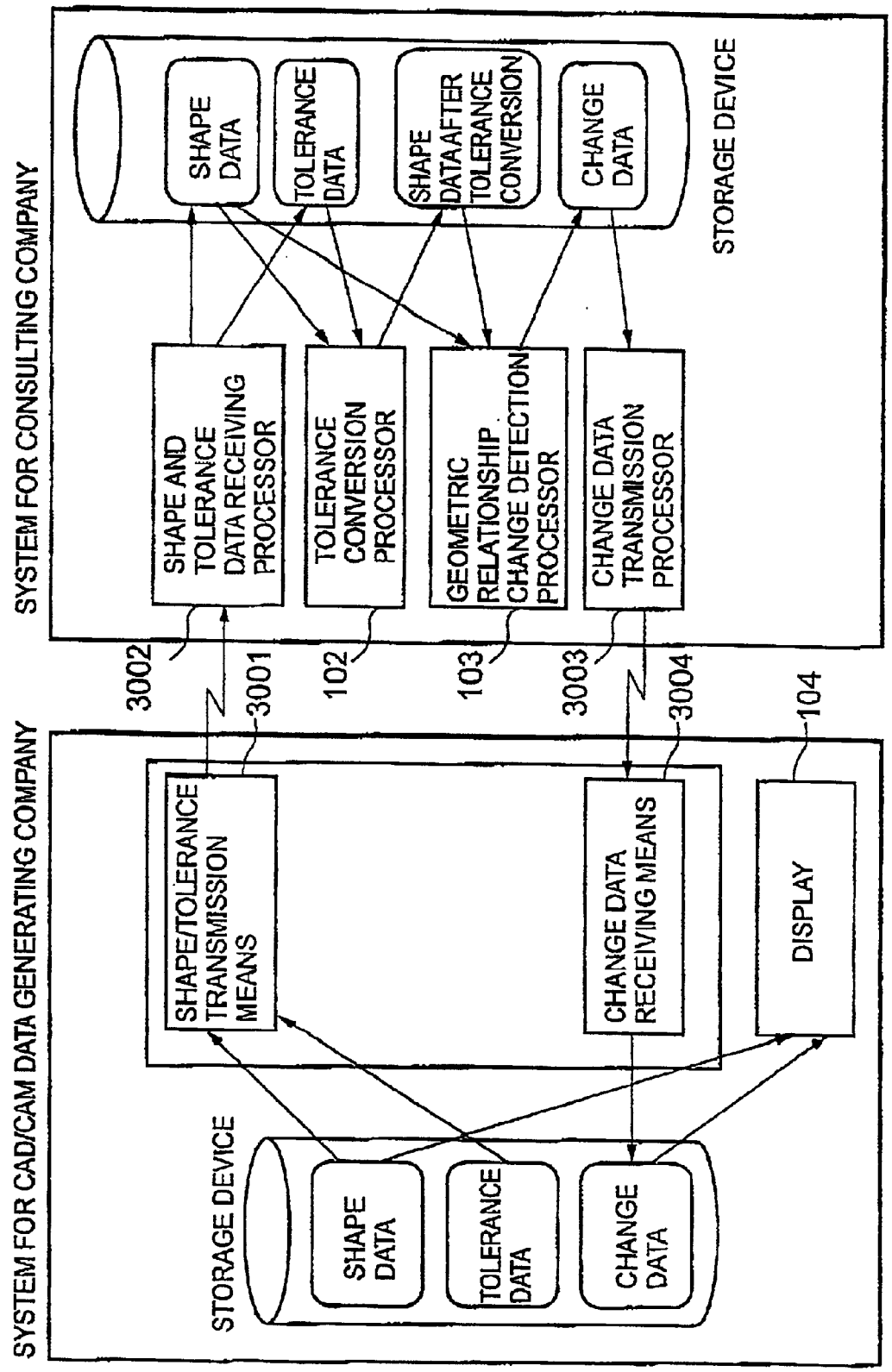
FIG. 30 is a block diagram of a consulting system according to the present invention.

A typical system configuration used in a consulting system according to the present invention is shown in FIG. 30.

Shape and tolerance data transmission means (processor) 3001 of the system for the CAD/CAM data generating company sends shape data and tolerance data stored in a data storage device of the CAD/CAM data generating company system to the consulting company system by using a communication device.

The shape and tolerance data receiving means (processor) 3002 of the consulting company system then obtains the shape data and tolerance data received by the communications device.

The tolerance conversion means (processor) 102 of the consulting company-system then generates shape data after tolerance conversion from the shape data and tolerance data received by the shape and tolerance data receiving means (processor) 3002.

The geometric relationship change detection means (processor) 103 of the consulting company system then detects change in the geometric relationship of the shape elements from the shape data received by the shape and tolerance data receiving means (processor) 3002 and the shape data after tolerance conversion generated by the tolerance conversion means (processor) 102.

A change data transmission means (processor) 3003 of the consulting company system then sends data for the changes detected by the detection means (processor) 103 to the CAD/CAM data generating company system using the communication device.

A change data receiving means (processor) 3004 of the CAD/CAM data generating company system then receives the data for the change transmitted by the change data transmission means (processor) 3003 of the consulting company system.

The change detected by the geometric relationship change detection means (processor) 103 is then displayed on the display 104 based on the original shape data and the change data received by the changed data receiving means (processor) 3004.

It Should be noted that the communications devices are connected by way of a network, the data communication can be accomplished over the Internet, for example.

Figure 31:
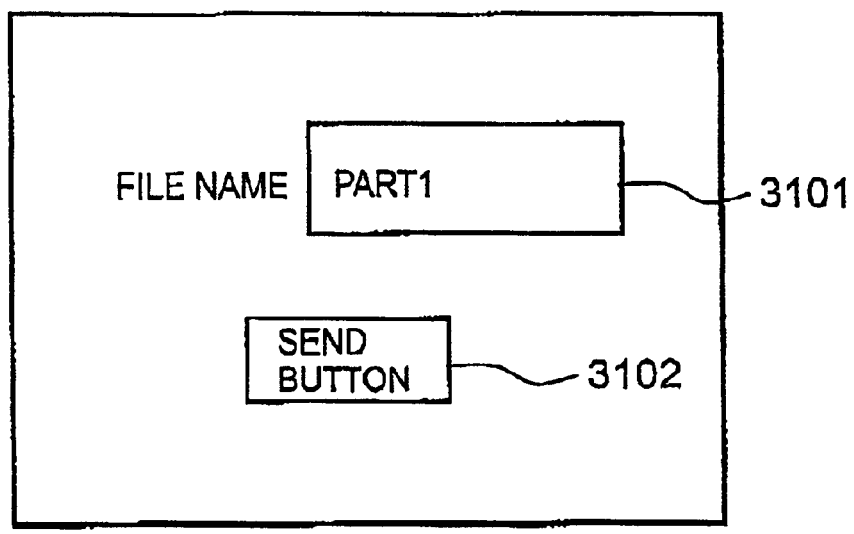
FIG. 31 is an exemplary operating interface for the shape/tolerance transmission means (processor) 3001.
Figure 32:
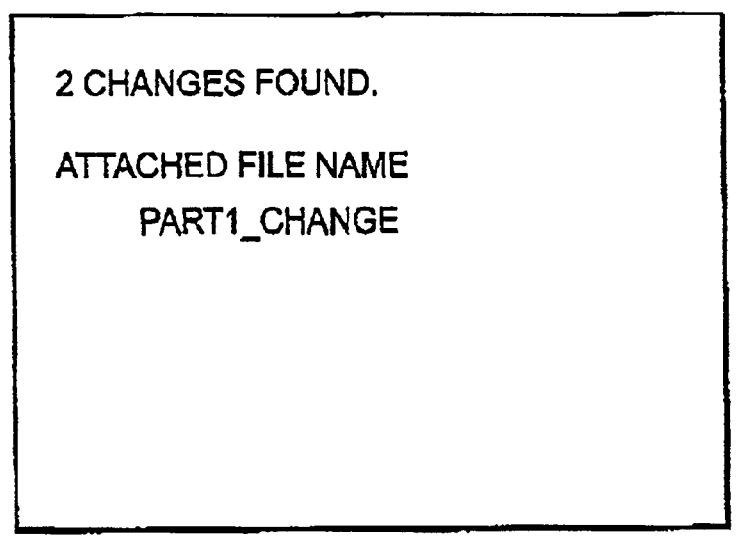
FIG. 32 shows an exemplary received message.
Figure 33:
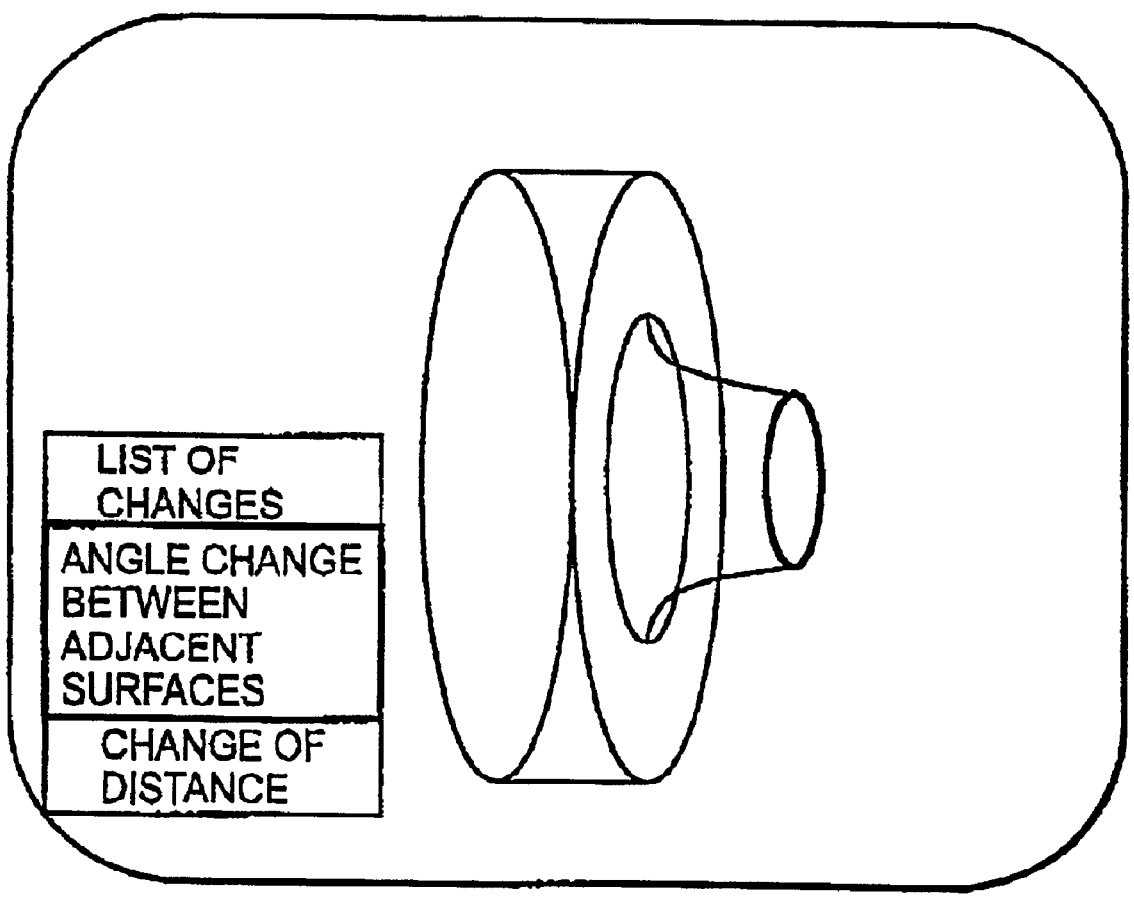
FIG. 33 is a screen showing a shape in which the changed shape elements are emphasized.

Operation of a computer system having the shape and tolerance data transmission means (processor) 3001, the change data receiving means (processor) 3004, and display 104 is shown in FIG. 31 to FIG. 33.

The shape and tolerance data transmission means (processor) 3001 can be achieved by, for example, sending data from a web page on the Internet (WWW).

FIG. 31 shows an operating screen of the shape and tolerance data transmission means (processor).

A file name for the shape data and tolerance data is entered to a file name input dialog box 3101, and a send button 3102 is then picked. The shape data and tolerance data will be stored under separate file names in some cases, and to the same file in other cases. The example shown in FIG. 31 assumes a case for a single file. The change data receiving means (processor) 3004 can be achieved by, for example, receiving e-mall.

FIG. 32 shows an example of received e-mail. The message contains the number of changes detected, and the change data is sent as an attached file. The file attached to the e-mail message in FIG. 32 can be double clicked, for example, to execute and display the file on the display 104. When the attached file, titled "part1_change" in this example, is double clicked, a list of changes is shown on the display as shown in FIG. 33 with the shape elements for which a geometric relationship change was detected and highlighted in the displayed shape.

Figure 34:
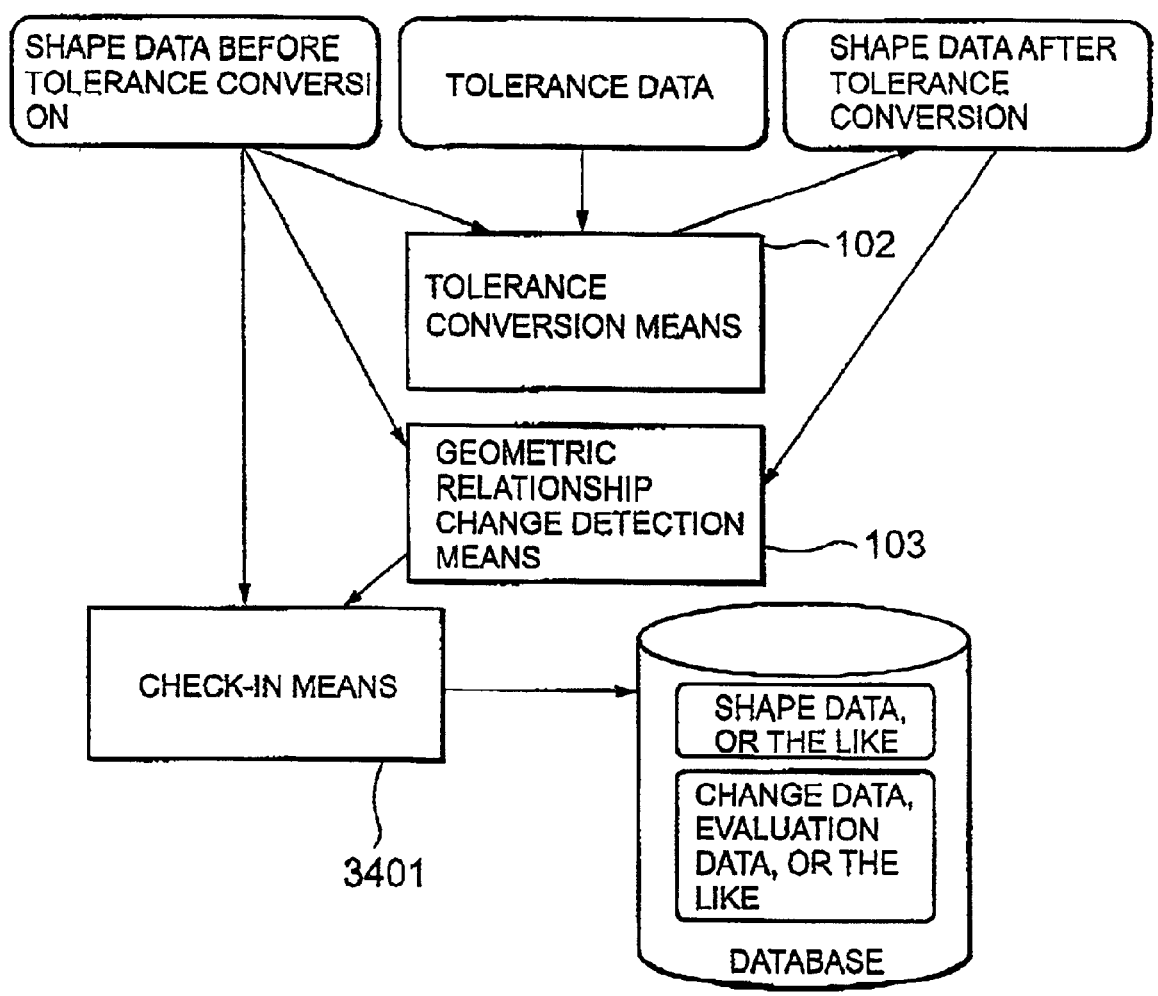
FIG. 34 is a consulting system according to the present invention.

FIG. 34 shows the configuration of a consulting system according to the present invention.

The tolerance conversion means (processor) 102 generates shape data after tolerance conversion from the shape data before tolerance conversion and the tolerance data. The geometric relationship change detection means (processor) 103 detects changes in the geometric relationships of the shape elements before and after tolerance conversion based on the shape data before tolerance conversion and the shape data after tolerance conversion generated by the tolerance conversion means (processor) 102.

A check-in means 3401 checks in the shape data before tolerance conversion and the data of detection results data by the detection means (processor) 103. An exemplary check-in process and data are described below.

A first check-in method is to check in the shape data before tolerance conversion in conjunction with the data for the changes detected by the geometric relationship change detection means (processor) 103.

A second method is to check in the shape data before tolerance conversion with a flag depending on the detection results from the geometric relationship change detection means (processor) 103. This flag can be used to indicate, for example, "OK", "NG" (no-good), or "confirmed".

A third method is to check in the shape data before tolerance conversion only when no changes are detected by the geometric relationship change detection means (processor) 103.

Figure 35:
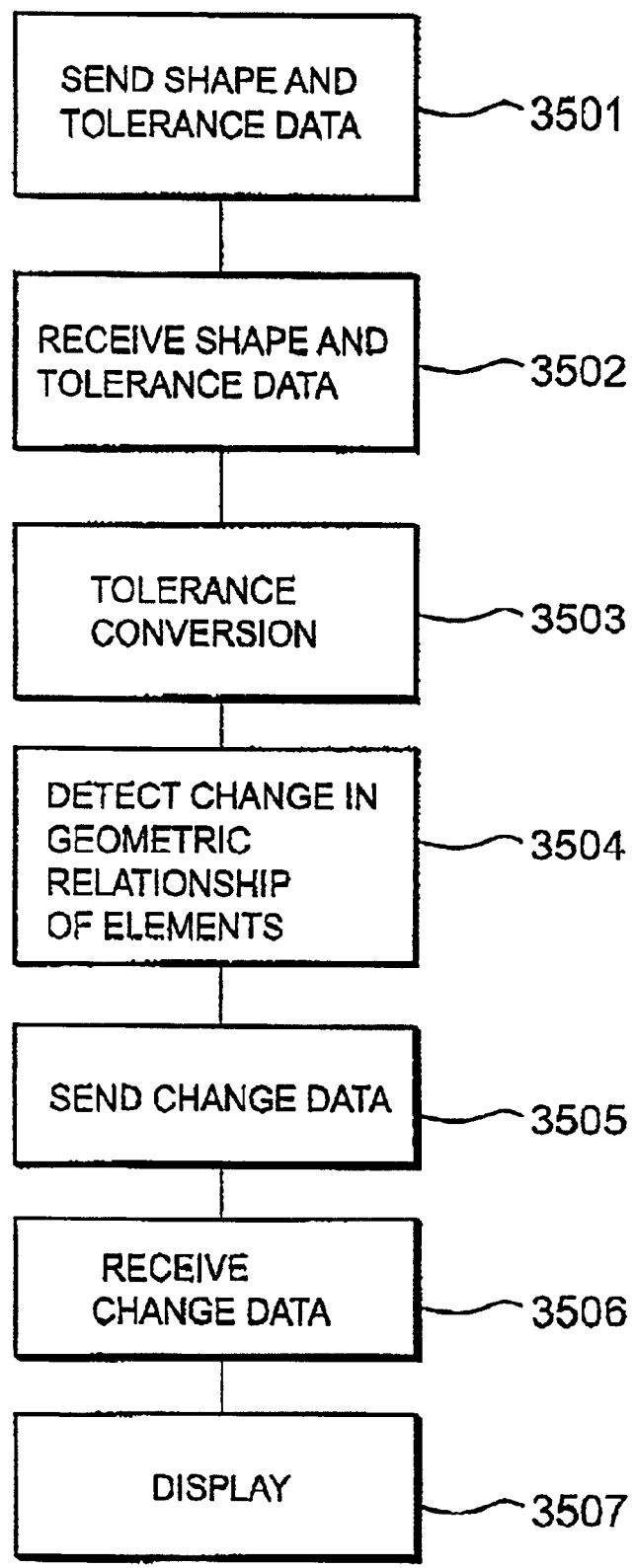
FIG. 35 is a flow chart of a consulting system service according to the present invention.

A flow chart of a consulting system service according to the present invention is shown in FIG. 35.

Shape data and tolerance data are sent via a network by a shape and tolerance data transmission means (processor) 3001 (step 3501).

The shape data and tolerance data sent in step 3501 is received (step 3502).

Shape data after tolerance conversion is generated from the shape data and the tolerance data received in step 3502 (step 3503).

Change in the geometric relationship of the shape elements is detected from the shape data received in step 3502 and the shape data after tolerance conversion generated in step 3503 (step 3504).

Data for the changes detected in step 3504 are sent over a network to the change data receiving means (processor) (step 3505).

The data for the change sent in the change data sending step 3505 is received (step 3506).

The changes detected in step 3504 are presented on the display based on the original shape data and the data for the change received in step 3506 (step 3507).

Figure 36:
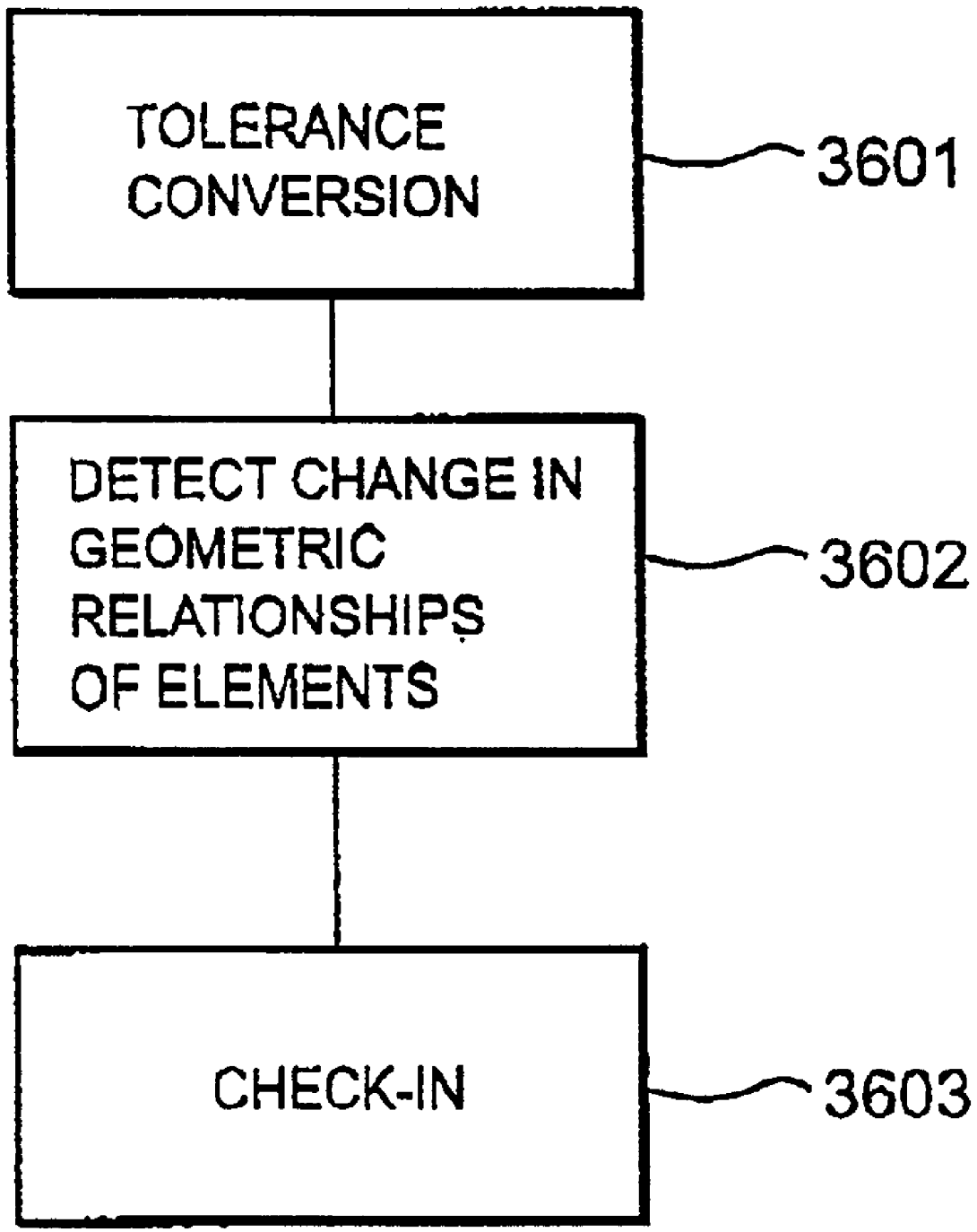
FIG. 36 is a flow chart of a consulting system according to the present invention.

FIG. 36 is a flow chart of a consulting system according to the present invention.

Shape data after tolerance conversion is generated from the shape data before tolerance conversion and the tolerance data (step 3601).

The change in the geometric relationship of the shape elements before and after tolerance conversion are detected from the shape data before tolerance conversion and the shape data after tolerance conversion generated in the tolerance conversion step 3601 (step 3602).

The shape data before tolerance conversion and the data of the detection results in step 3602 are checked in (step 3603).

We claim:

1. A method for providing a consulting service for CAD data, comprising steps of:
    obtaining shape data for a design object and process dimensions data for the design object from a customer system by way of a communication line;
    obtaining a geometric relationships for shape elements before tolerance conversion based on the shape data and the process dimensions data received from the customer system;
    carrying out tolerance conversion using the shape data and process dimensions data;
    obtaining a geometric relationship for the shape elements after tolerance conversion based on shape data after tolerance conversion;
    determining whether the geometric relationships of the shape elements after tolerance conversion and the geometric relationships of the same shape elements before tolerance conversion are the same or not based on the geometric relationships of the shape elements before tolerance conversion and the geometric relationships of the shape elements after tolerance conversion; and
    notifying the customer system by way of the communication line that an inappropriate shape occurred as a result of tolerance conversion when the geometric relationships are not the same.

2. A method as described in claim 1, wherein an image enabling identification of a shape element after tolerance conversion having a geometric relationship that is not identical to a geometric relationship of the shape element before tolerance conversion is sent in conjunction with the determination result to the customer system by way of the communication line.

3. A method as described in claim 2, wherein the images of the design object include an image in which a shape element after tolerance conversion that has a geometric relationship not the same as the geometric relationship of the shape element before tolerance conversion is displayed using a format different from the display format of a shape element having the same geometric relationship as before tolerance conversion.

4. A method as described in claim 1, wherein the shape element means a surface, line, point, axis of a rotating surface, or center of an arc defining a shape of the design object, and
    the geometric relationship of the shape element means an angle between the shape elements, that the shape elements are parallel, a position of each of the shape elements is the same, a distance between the shape elements is the same, or a parameter defining each of the shape elements is the same.

5. A method as described in claim 2, wherein the shape element means a surface, line, point, axis of a rotating surface, or center of an arc defining a shape of the design object, and
    the geometric relationship of the shape element means an angle between the shape elements, that the shape elements are parallel, a position of each of the shape elements is the same, a distance between the shape elements is the same, or a parameter defining each of the shape elements is the same.

6. A method as described in claim 3, wherein the shape element means a surface, line, point, axis of a rotating surface, or center of an arc defining a shape of the design object, and
    the geometric relationship of the shape element means an angle between the shape elements, that the shape elements are parallel, a position of each of the shape elements is the same, a distance between the shape elements is the same, or a parameter defining each of the shape elements is the same.

7. A method for detecting an inappropriate shape change resulting from tolerance conversion, comprising steps of:
    obtaining a geometric relationship of a shape element before tolerance conversion based on shape data and process dimensions data for the design object;
    carrying out tolerance conversion using the shape data and the process dimensions data;
    obtaining a geometric relationship for the shape elements after tolerance conversion based on shape data after tolerance conversion;
    determining whether the geometric relationship of shape elements after tolerance conversion and the geometric relationship of the shape elements before tolerance conversion are the same or not based on the geometric relationship of the shape elements before tolerance conversion and the geometric relationship of the shape elements after tolerance conversion; and
    displaying on a display device that an inappropriate shape occurred as a result of tolerance conversion when the geometric relationships are not the same.

8. A method as described in claim 7, wherein an image enabling identification of a shape element after tolerance conversion having a geometric relationship that is not identical to a geometric relationship of the shape element before tolerance conversion is displayed in conjunction with the determination result on the display device.

9. A method as described in claim 8, wherein images of the design object include an image in which a shape element after tolerance conversion that has a geometric relationship not the same as the geometric relationship of the shape element before tolerance conversion is displayed using a format different from the display format of a shape element having the same geometric relationship as before tolerance conversion.

10. A method as described in claim 7, wherein the shape element means a surface, line, point, axis of a rotating surface, or center of an arc defining a shape of the design object, and
    the geometric relationship of the shape element means an angle between the shape elements, that the shape elements are parallel, a position of each of the shape elements is the same, a distance between the shape elements is the same, or a parameter defining each of the shape elements is the same.

11. A method as described in claim 8, wherein the shape element means a surface, line, point, axis of a rotating surface, or center of an arc defining a shape of the design object, and the geometric relationship of the shape element means an angle between the shape elements, that the shape elements are parallel, a position of each of the shape elements is the same, a distance between the shape elements is the same, or a parameter defining each of the shape elements is the same.

12. A method as described in claim 9, wherein the shape element means a surface, line, point, axis of a rotating surface, or center of an arc defining a shape of the design object, and the geometric relationship of the shape element means an angle between the shape elements, that the shape elements are parallel, a position of each of the shape elements is the same, a distance between the shape elements is the same, or a parameter defining each of the shape elements is the same.

13. A computer readable data storage medium storing a program for achieving functions in a computer, said functions comprising:

a function for obtaining shape data for a design object and process dimensions data for the design object from a customer system by way of a communication line;

a function for obtaining a geometric relationship for shape elements before tolerance conversion based on the shape data and the process dimensions data received from the customer system;

a function for carrying out tolerance conversion using the shape data and the process dimensions data;

a function for obtaining a geometric relationship of the shape elements after tolerance conversion based on shape data after tolerance conversion;

a function for determining whether the geometric relationship of shape elements after tolerance conversion and the geometric relationship of the shape elements before tolerance conversion are the same or not based on the geometric relationship of shape elements before tolerance conversion and the geometric relationship of said shape elements after tolerance conversion; and a function for notifying the customer system by way of the communication line that an inappropriate shape occurred as a result of tolerance conversion when the geometric relationships are not the same.

14. A data storage medium as described in claim 13, wherein the program further achieves a function for sending to the customer system by way of the communication line in conjunction with the determination result an image enabling identification of a shape element after tolerance conversion having a geometric relationship that is not identical to a geometric relationship of the shape element before tolerance conversion.

15. A data storage medium as described in claim 14, wherein images of the design object include an image in which a shape element after tolerance conversion that has a geometric relationship not the same as the geometric relationship of the shape element before tolerance conversion is displayed using a format different from the display format of a shape element having the same geometric relationship as before tolerance conversion.

16. A data storage medium as described in claim 13, wherein the shape element means a surface, line, point, axis of a rotating surface, or center of an arc defining a shape of the design object, and the geometric relationship of the shape element means an angle between the shape elements, that the shape elements are parallel, a position of each of the shape elements is the same, a distance between the shape elements is the same, or a parameter defining each of the shape elements is the same.

17. A data storage medium as described in claim 14, wherein the shape element means a surface, line, point, axis of a rotating surface, or center of an arc defining a shape of the design object, and the geometric relationship of the shape element means an angle between the shape elements, that the shape elements are parallel, a position of each of the shape elements is the same, a distance between the shape elements is the same, or a parameter defining each of the shape elements is the same.

18. A data storage medium as described in claim 15, wherein the shape element means a surface, line, point, axis of a rotating surface, or center of an arc defining a shape of the design objects and the geometric relationship of the shape element means an angle between the shape elements, that the shape elements are parallel, a position of each of the shape elements is the same, a distance between the shape elements is the same, or a parameter defining each of the shape elements is the same.

19. A computer program product comprising:

computer readable program code means for obtaining shape data for a design object and process dimensions data for the design object from a customer system by way of a communication line;

computer readable program code means for obtaining a geometric relationship for shape elements before tolerance conversion based on the shape data and process dimensions data received from the customer system;

computer readable program code means for carrying out tolerance conversion using the shape data and the process dimensions data;

computer readable program code means for obtaining a geometric relationship for shape elements after tolerance conversion based on shape data after tolerance conversion;

computer readable program code means for determining whether the geometric relationship of the shape elements after tolerance conversion and the geometric relationship of the same shape elements before tolerance conversion are the same or not based on the geometric relationship of the shape elements before tolerance conversion and the geometric relationships of the shape elements after tolerance conversion; and computer readable program code means for notifying the customer system by way of the communication line that an inappropriate shape occurred as a result of tolerance conversion when the geometric relationships are not the same.

20. A computer program product comprising:

computer readable program code means for obtaining a geometric relationship of a shape element before tolerance conversion based on shape data and process dimensions data for the design object;

computer readable program code means for carrying out tolerance conversion using the shape data and the process dimensions data;

computer readable program code means for obtaining a geometric relationship for shape elements after tolerance conversion based on shape data after tolerance conversion;

computer readable program code means for determining whether the geometric relationships of the shape elements after tolerance conversion and the geometric relationship of the shape elements before tolerance conversion are the same or not based on the geometric relationships of shape elements before tolerance conversion and the geometric relationships of said shape elements after tolerance conversion; and computer readable program code means for displaying on a display device that an inappropriate shape occurred as a result of tolerance conversion when the geometric relationships are not the same.

* * * * *